US012507053B2

(12) United States Patent
Piantedosi

(10) Patent No.: US 12,507,053 B2
(45) Date of Patent: *Dec. 23, 2025

(54) PERSONAL SAFETY AND RESPONDER NOTIFICATION SYSTEM AND METHOD

(71) Applicant: Avery Piantedosi, Rochester Hills, MI (US)

(72) Inventor: Avery Piantedosi, Rochester Hills, MI (US)

(*) Notice: Subject to any disclaimer, the term of this patent is extended or adjusted under 35 U.S.C. 154(b) by 347 days.

This patent is subject to a terminal disclaimer.

(21) Appl. No.: 17/665,572

(22) Filed: Feb. 6, 2022

(65) Prior Publication Data

US 2022/0159443 A1 May 19, 2022

Related U.S. Application Data

(63) Continuation-in-part of application No. 15/735,106, filed as application No. PCT/US2016/037094 on Jun. 10, 2016, now Pat. No. 11,670,152.

(60) Provisional application No. 62/173,397, filed on Jun. 10, 2015.

(51) Int. Cl.
*G08B 1/08* (2006.01)
*H04W 4/029* (2018.01)
*H04W 4/12* (2009.01)
*H04W 4/90* (2018.01)

(52) U.S. Cl.
CPC ............. *H04W 4/90* (2018.02); *H04W 4/029* (2018.02); *H04W 4/12* (2013.01)

(58) Field of Classification Search
CPC .......... H04W 4/90; H04W 4/029; H04W 4/12
See application file for complete search history.

(56) References Cited

U.S. PATENT DOCUMENTS

| | | | | |
|---|---|---|---|---|
| 6,175,329 B1 * | 1/2001 | Vicci | ..................... | G08B 21/043 342/357.55 |
| 7,076,235 B2 * | 7/2006 | Esque | ................... | H04W 76/50 455/404.1 |
| 7,224,956 B1 * | 5/2007 | O'Neil | ................... | H04W 76/50 455/404.1 |
| 7,629,891 B1 * | 12/2009 | Bell | ..................... | G08B 25/005 340/506 |
| 7,742,757 B2 * | 6/2010 | Carlson | ................... | H04W 4/02 455/414.2 |
| 7,831,235 B2 * | 11/2010 | Mononen | ........... | G08B 21/0415 455/403 |

(Continued)

*Primary Examiner* — Quang Pham
(74) *Attorney, Agent, or Firm* — Lowndes; Stephen C. Thomas; R. Richard Fredeking

(57) ABSTRACT

A system that operates entirely automatically to determine that user may be in distress and unable to contact authorities, and is operable to identify the proper location PSAP that is in geographic proximity to the user; to notify a proper local PSAP of the user's location, the user's identity, the identification of the contact with whom the user expected to meet, the geographic location of the expected meeting place, the time at which the user failed to check in, and other information regarding the user, the contact or the meeting; and to automatically connect the user's cell phone with the proper location PSAP. The elimination of the need for a call center, and the ability to automatically identify and connect the user to the proper PSAP even when the user is unable to respond or interact, are significant advantages of the system of the invention.

16 Claims, 15 Drawing Sheets

(56) References Cited

U.S. PATENT DOCUMENTS

| | | | | |
|---|---|---|---|---|
| 7,855,935 B1* | 12/2010 | Lauder | G01S 3/80 | 367/128 |
| 7,880,610 B2* | 2/2011 | Tanner | G07C 9/27 | 340/572.1 |
| 7,928,851 B2* | 4/2011 | Stanners | G08B 25/016 | 340/539.11 |
| 8,116,723 B2* | 2/2012 | Kaltsukis | H04L 65/1069 | 455/403 |
| 8,116,724 B2* | 2/2012 | Peabody | G08B 25/001 | 455/457 |
| 8,170,525 B2* | 5/2012 | Martin | H04W 76/50 | 455/414.1 |
| 8,515,452 B2* | 8/2013 | Craine | G08B 21/0261 | 455/418 |
| 8,538,370 B2* | 9/2013 | Ray | H04M 3/5116 | 455/404.1 |
| 8,548,422 B2* | 10/2013 | Jenkins | H04M 11/045 | 379/38 |
| 8,554,170 B2* | 10/2013 | Franz | H04W 4/14 | 455/564 |
| 8,706,093 B2* | 4/2014 | Dove | G06Q 10/10 | 455/414.1 |
| 8,761,720 B2* | 6/2014 | Ray | H04W 76/50 | 455/456.3 |
| 8,918,075 B2* | 12/2014 | Maier | H04W 4/025 | 370/352 |
| 8,924,676 B1* | 12/2014 | Anderson | G06F 12/0646 | 711/112 |
| 9,342,976 B2* | 5/2016 | Pfeffer | H04W 76/50 | |
| 9,483,932 B2* | 11/2016 | Amis | G08B 27/00 | |
| 9,860,721 B2* | 1/2018 | Nam | G08B 25/08 | |
| 10,373,121 B2* | 8/2019 | Chen | G06Q 10/1093 | |
| 11,129,010 B2* | 9/2021 | Wickham | H04W 4/029 | |
| 2002/0107927 A1* | 8/2002 | Gallant | G08B 21/0423 | 709/206 |
| 2003/0086539 A1* | 5/2003 | McCalmont | H04Q 3/72 | 379/46 |
| 2004/0180683 A1* | 9/2004 | Dennis | H04W 4/06 | 455/521 |
| 2004/0248573 A1* | 12/2004 | Wandel | H04W 28/18 | 455/435.1 |
| 2005/0086261 A1* | 4/2005 | Mammone | G08B 21/0222 | |
| 2005/0151642 A1* | 7/2005 | Tupler | H04W 76/50 | 340/539.18 |
| 2005/0208925 A1* | 9/2005 | Panasik | H04M 1/72421 | 455/404.1 |
| 2007/0167147 A1* | 7/2007 | Krasner | G08G 1/205 | 455/404.2 |
| 2007/0293186 A1* | 12/2007 | Lehmann | H04M 11/04 | 455/404.2 |
| 2008/0118039 A1* | 5/2008 | Elliot | H04L 12/66 | 379/45 |
| 2008/0188198 A1* | 8/2008 | Patel | G06F 21/6245 | 455/404.2 |
| 2008/0214142 A1* | 9/2008 | Morin | H04M 1/72424 | 455/404.1 |
| 2010/0048163 A1* | 2/2010 | Parr | H04W 64/00 | 455/562.1 |
| 2010/0097989 A1* | 4/2010 | Huang | H04W 4/02 | 370/328 |
| 2010/0144370 A1* | 6/2010 | Jang | G01S 19/40 | 455/456.2 |
| 2011/0210847 A1* | 9/2011 | Howard | G08B 21/0244 | 340/539.32 |
| 2011/0281546 A1* | 11/2011 | Libkind | H04L 51/222 | 455/404.1 |
| 2011/0288379 A1* | 11/2011 | Wu | G16H 40/67 | 600/301 |
| 2011/0294457 A1* | 12/2011 | Braznell | G08B 21/0283 | 455/404.1 |
| 2011/0319051 A1* | 12/2011 | Reitnour | H04W 4/185 | 342/357.55 |
| 2012/0088468 A1* | 4/2012 | Dickinson | H04W 4/33 | 455/404.2 |
| 2012/0126974 A1* | 5/2012 | Phillips | G08B 21/0272 | 340/539.13 |
| 2012/0155323 A1* | 6/2012 | Ramachandran | H04L 45/563 | 370/254 |
| 2012/0246089 A1* | 9/2012 | Sikes | G06Q 10/1093 | 705/325 |
| 2012/0268269 A1* | 10/2012 | Doyle | G08B 21/22 | 340/539.13 |
| 2012/0329420 A1* | 12/2012 | Zotti | H04W 4/029 | 455/404.2 |
| 2013/0029634 A1* | 1/2013 | Li | H04W 4/029 | 455/404.1 |
| 2013/0052982 A1* | 2/2013 | Rohde | H04M 1/72424 | 455/404.1 |
| 2013/0231077 A1* | 9/2013 | Cahill | G08B 25/008 | 455/404.2 |
| 2013/0276124 A1* | 10/2013 | Tahir | H04W 4/029 | 726/25 |
| 2014/0019184 A1* | 1/2014 | Herickhoff | G06Q 10/1095 | 705/7.19 |
| 2014/0028783 A1* | 1/2014 | Kaltsukis | G08B 25/014 | 348/E7.078 |
| 2014/0194082 A1* | 7/2014 | Wingert | H04M 3/42221 | 455/404.1 |
| 2014/0248858 A1* | 9/2014 | Soomro | G08B 3/1041 | 455/412.2 |
| 2014/0295885 A1* | 10/2014 | Marko | H04W 4/02 | 455/456.1 |
| 2014/0351958 A1* | 11/2014 | Sabulsky | G06F 21/6245 | 726/30 |
| 2014/0354449 A1* | 12/2014 | Alam | G08G 1/164 | 340/902 |
| 2015/0009011 A1* | 1/2015 | Cahill | G08B 25/008 | 340/7.58 |
| 2015/0031348 A1* | 1/2015 | Lee | G06F 3/0482 | 455/418 |
| 2015/0112748 A1* | 4/2015 | Kaye | H04W 4/80 | 705/7.19 |
| 2015/0269835 A1* | 9/2015 | Benoit | H04M 19/04 | 340/539.13 |
| 2015/0296360 A1* | 10/2015 | Saito | H04W 4/90 | 455/404.2 |
| 2015/0346983 A1* | 12/2015 | Adler | G06Q 10/1093 | 715/772 |
| 2015/0347591 A1* | 12/2015 | Bax | G06Q 50/01 | 707/749 |
| 2016/0057597 A1* | 2/2016 | Hines | H04W 4/90 | 455/404.1 |
| 2016/0088435 A1* | 3/2016 | Weksler | H04W 4/021 | 455/414.2 |
| 2016/0232773 A1* | 8/2016 | Abeyta | H04L 51/046 | |
| 2017/0099579 A1* | 4/2017 | Ryan | H04M 3/5116 | |
| 2017/0279751 A1* | 9/2017 | Quirarte | H04L 51/08 | |
| 2019/0156655 A1* | 5/2019 | Cordes | H04W 4/90 | |
| 2020/0143654 A1* | 5/2020 | Howard | H04W 4/90 | |
| 2020/0413238 A1* | 12/2020 | Bohlander | H04W 4/90 | |
| 2021/0314756 A1* | 10/2021 | Brooks | H04W 4/029 | |
| 2021/0352438 A1* | 11/2021 | Ford | H04W 4/029 | |
| 2022/0141917 A1* | 5/2022 | Sanghavi | H04W 76/50 | 455/3.05 |

* cited by examiner

PERSONAL SAFETY AND RESPONDER NOTIFICATION SYSTEM AND METHOD

CROSS REFERENCE TO RELATED APPLICATIONS

This patent application is a continuation in part of, and claims benefit of priority to, U.S. patent application Ser. No. 15/735,106 which was filed in the United States Patent and Trademark Office (USPTO) on Dec. 8, 2017 and which published from the USPTO as U.S. Publication No. US 2019-0371151 A1 on Dec. 5, 2019, the disclosure of which is incorporated herein by reference in its entirety; U.S. patent application Ser. No. 15/735,106 was a national stage of international application no. PCT/US16/37094 filed in the United States Receiving Office (USRO) on Jun. 10, 2016 and was published as international publication WO 2016/201376 on Dec. 15, 2016, the disclosure of which is incorporated herein by reference in its entirety; international application no. PCT/US16/37094 claims benefit of priority to U.S. provisional patent application Ser. No. 62/173,397 which was filed in the United States Patent and Trademark Office on Jun. 10, 2015, the disclosure of which is also incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

This invention relates to the field of devices, systems and methods for personal protection systems and methods, including systems and methods for contacting and dispatching first responders, or emergency responders, in some cases automatically (i.e. without the need for user action or without the need for any action by a third party such as a call center) upon the occurrence of one or more triggering alarm or distress events. More specifically, the invention relates to the field of notification systems that may notify authorities or other designated individuals in the event a user is in personal danger, is missing, is unable to respond, has directly signaled that they are in distress or otherwise may be subject to an unsafe condition or environment, and, in embodiments, automatically contacting and dispatching first, or emergency, responders without the need for human intervention to assist in contacting the first, or emergency, responders.

2. Background Art

Devices and methods that have historically been utilized for personal protection and/or notification of a designated individual or authorities in the event in which a user is subjected to a personal danger typically rely upon some positive action to be taken by the user. For example, certain devices have been suggested as personal safety devices such as whistles, handguns, spray containers containing a defensive chemicals such as Mace® or pepper spray, the use of cell phones to dial 911 in case of an emergency, and other like devices, methods and systems which require affirmative action by the user to call for aid or rescue if they should find themselves in a dangerous condition or environment, or under threat to their personal safety.

A significant drawback of the systems, methods and devices of the prior art is that they require affirmative action to be taken by the user. Thus, if the user is surprised or caught unaware so as to allow an attacker to disable their ability to take the affirmative action, no alarm, distress or other signal can be communicated by the user, leaving them in distress or danger which may include mortal peril. This drawback of the prior art is a significant one, because there are many situations which arise in which a victim may be caught unawares and rendered unable to, for example, dial 911 or to make use of E911 systems, signal using a whistle or other device, or reach into a purse or other container to retrieve a weapon such as a handgun or defensive chemical spray. In these situations, a victim may be caught unawares, rendered defenseless, and attacked without any opportunity for the victim to signal for help. Even worse, there may transpire a significant period of time such as hours or days before anyone knows that the victim has encountered trouble. In such situations, by the time loved ones or authorities are aware that the victim has been subjected to a dangerous condition or situation, it may be too late to locate the victim or to render assistance in a meaningful way.

Additionally, there are other situations in which a person may be rendered defenseless and unable to make a call for help. These situations may arise, for example, in the case of elderly individuals or other physically challenged individuals living alone who suffer a medical emergency that renders them unable to call for help. In such situations, the user may not be able to activate a signaling device such as a pendant, cell phone, or other communication device to call for help. There are a significant number of medical emergencies that that may arise which could result in a user being unable to activate a signaling device. The result may be that the victim of a medical emergency may be left unattended for hours or days, even weeks, resulting in significant personal injury or even death.

There are also numerous situations in which an individual may encounter personal danger, medical emergency or other conditions, environments or situations in which it would be advantageous for law enforcement, monitoring personnel, loved ones, pre-designated individuals, or other individuals can be made aware that the individual is in danger or suffering a medical emergency, without requiring the user to take affirmative action to activate a signaling device. Such situations include but are not limited to real estate professionals who may be showing properties to potential participants in real estate transactions; individuals who are alone with others in social situations such as, for example, dating or business meetings; children who may be participating in events outside of their parents supervision or returning home from school while their parents are at work; elderly or physically challenged individuals who live alone or may be taking, for example, trips or extended vacations without companions; and numerous other like situations. The examples given here are not to be construed as limiting but are provided merely as exemplary of the numerous situations in which an individual may encounter danger and be unable to take affirmative action to signal for help. In these situations, an individual may encounter a threat to their personal safety, medical emergency, or another condition or situation in which they are rendered unable to call for help using, for example, a cell phone or other signaling device. In these situations it would be desirable that a third party, such as but not limited to individuals, emergency contacts or first or emergency responders, could be made aware that that individual may be in a dangerous situation so that help can be timely rendered to a user in distress, without the need for any affirmative action on the user's part.

It is desirable, in some situations, that the location of the user be provided to the third party or first or emergency responder such that assistance can be rendered quickly. In recent years, the advent of systems such as E911 (Enhanced 911) systems has provided an ability to include geolocation information in those situations in which calls are made to a recognized first responder contact system, such as for example, 911, from a cell phone. E911 systems may provide the caller's geographic location information to 911 first responder dispatchers. However, in order for an E911 system to provide the user's geographic location information to 911 first responder dispatchers, the E911 system must first determine the user's geographic location. In the prior systems, there are two methods used by E911 systems to determine the geographic location of a user.

In the case of a 911 call from a user using a landline, the E911 system may use a database lookup that associates the telephone number of the user with a physical address.

In the case of call from a user utilizing a cell phone, the E911 system may rely upon the services of a mobile switching center (MSC) to triangulate the user's position using cell tower signal receipt and cell tower geographic location information to determine an estimate of the user's geographic location. Alternatively, the E911 system may utilize Global Positioning System (GPS) geolocation information from the user's cell phone.

However, both of the aforementioned techniques for determining the geographic location of a user, so that the user's geographic location may be presented to first responder or emergency responder dispatchers, suffer from a significant drawback in that they require the user to place a call to the 911 system. What if the user who is in distress is unable to place a call to the 911 system, such as in situations in which the user has been disabled, they are denied access to their phone, or they have been otherwise rendered unable to place the call? In such cases, the present systems and methods of the art are unable to provide the geographic location of a user to a third party or first responder or emergency responder dispatcher.

The present invention overcomes the shortcomings of the prior art by providing a system and method for automatically, i.e. without the need for affirmative action by the user or any intermediary (such as, for example, a call center) alerting a third party that an individual may have encountered a threat to their personal safety, or may have suffered a medical other event, that may have rendered them unable to call for help; including, in embodiments, automatically notifying a third party; automatically notifying first responders or emergency responders using systems such as 911 and E911 or functionally equivalent systems; and, in embodiments, providing the geographic location of the user to the third party, first responders or emergency responders so that they may dispatched to an alarm event geographic location without the need for affirmative action by the user or any intermediary, such a call center.

BRIEF SUMMARY OF THE INVENTION

The system and method may comprise any of the features and elements, and any combination of the features and elements, disclosed herein, including but not limited to the following.

In embodiments, the invention comprises a method for dispatching a first responder to an alarm event geographic location of a user who is in distress, comprising; determining that an alarm event has occurred, the alarm event having an alarm event geographic location defining where the user expected to meet the contact, or the geographic location of the user's personal electronic device, or both; producing an alarm event audio signal containing alarm event information, wherein the alarm event information includes the alarm event geographic location; transmitting the alarm event audio signal containing alarm event information to an E911 tandem interface via a system voice call, such that the E911 tandem interface is able to determine the proper location PSAP having a jurisdictional geographic area that includes the geographic location of the alarm event; bridging, routing or forwarding the system voice telephone call to the proper location PSAP such that the personnel or equipment comprising the proper location PSAP are able to receive the alarm event audio signal containing alarm event information; and communicating the alarm event audio signal to the proper location PSAP, enabling the dispatch of first responders to the alarm event geographic location without the need for any action by the user in distress or by any intermediary, such as a call center.

In embodiments, the step of determining that an alarm event has occurred may be further defined as the user not responding to a check-in telephone call. The step of determining that an alarm event has occurred may further be defined as the user not responding to a check-in message, which may be a text or other message.

In embodiments, the step of determining that an alarm event has occurred may further be defined as the user responding to a check-in telephone call or check-in message with distress or alarm code.

The method of the invention may further comprise the step of receiving and storing the user's personal electronic device DID, or the user's personal electronic device telephone number, and event information, which may include, but not be limited to, event geographic location information, prior to the step of determining that an alarm event has occurred.

In embodiments, the step of producing an alarm event audio signal may be preceded by a step of retrieving the user's personal electronic device DID and the event information from storage and converting the personal electronic device DID and the event information into a speech or other audio signal for communicating via a telephone call. Computer readable and executable instructions, or firmware, running on a server or other computer, may perform this text-to-speech function.

In embodiments, the method of the invention may further comprise the steps of placing a system user call, which may be a telephone call, from a server to a personal electronic device of the user, and bridging the system user call with the system voice call, so that the user is in direct voice communication with the proper location PSAP, enabling the user to communicate information directly to the proper location PSAP such that the proper location PSAP is able to dispatch emergency responders to the user in distress more efficiently or more quickly.

In embodiments, if the user does not answer the system user call, the server may repeat the step of placing a system user call from said server to said personal electronic device of the user.

In embodiments, the method of the invention may further comprise the step of the system server receiving user personal electronic device geographic location information from said user's personal electronic device, and transmitting said user personal electronic device geographic location information to said proper location PSAP via the bridged system user voice call and said system voice call.

In embodiments, the method of the invention may further comprise the step of said server receiving user personal electronic device geographic location information from said user's personal electronic device via an data communication network, and transmitting said user personal electronic device geographic location information to said proper location PSAP via the bridged system user voice call and said system voice call.

In embodiments, the invention comprises a system for dispatching a first responder to an alarm event geographic location, comprising; a system server able to communicate with a user personal electronic device; wherein the server may also be in communication with an E911 tandem interface; and wherein the server comprises non-transitory computer readable and executable instructions for: determining that an alarm event has occurred; producing an alarm event audio signal containing alarm event information, wherein the alarm event information includes an alarm event geographic location that may be a geographic location at which the user expected to meet a contact, or it may be the geographic location of the user; transmitting the alarm event audio signal containing alarm event information to the E911 tandem interface via a system voice telephone call, such that the E911 tandem interface is able to determine the proper location PSAP having a jurisdictional geographic area that includes the geographic location of the alarm event; remaining connected to the proper location PSAP via the system voice telephone call while the proper location PSAP routes the system voice telephone call to the proper location PSAP; and communicating the alarm event audio signal to the proper location PSAP, enabling the dispatch of first responders to the alarm event geographic location.

In embodiments, the system of the invention may further comprise non-transitory computer readable and executable instructions for determining that an alarm event has occurred by detecting that the user not has not responded to a check-in telephone call.

In embodiments, the system of the invention may further comprise non-transitory computer readable and executable instructions for determining that an alarm event has occurred by detecting that the user has not responded to a check-in message.

In embodiments, determining that an alarm event has occurred may further be defined as the user responding to a check-in telephone call or check-in message with a distress code.

In embodiments, the system of the invention may further comprise non-transitory computer readable and executable instructions for receiving and storing said user's personal electronic device DID and said event information.

In embodiments, the system of the invention may further comprise non-transitory computer readable and executable instructions for retrieving the user's personal electronic device DID and the event information from storage and converting the personal electronic device DID and the event information into an audio message.

In embodiments, the system of the invention may further comprise non-transitory computer readable and executable instructions for placing a system user call from a server to a personal electronic device of said user, and for bridging the system user call with the system voice call.

In embodiments, the system of the invention may further comprise non-transitory computer readable and executable instructions for repeatedly placing a system user call from the server to the personal electronic device of the user if the user does not answer the system user call.

In embodiments, the system of the invention may further comprise non-transitory computer readable and executable instructions for receiving user personal electronic device geographic location information from the user's personal electronic device, and transmitting the user personal electronic device geographic location information to the proper location PSAP via the bridged system user call and system voice call.

In embodiments, the system of the invention may further comprise non-transitory computer readable and executable instructions for receiving user personal electronic device geographic location information from the user's personal electronic device via a data communication network, and transmitting the user personal electronic device geographic location information to the proper location PSAP via the bridged system user call and the system voice call.

BRIEF DESCRIPTION OF THE DRAWINGS

The following figures of the drawings depict an exemplary embodiment of the system and method of the invention. As the embodiment depicted in the figures of the drawings is an exemplary embodiment, it is to be understood that all equivalent embodiments are included with the scope of the invention.

DETAILED DESCRIPTION OF THE INVENTION

Although a detailed description of exemplary embodiments of the system and method of the invention as provided herein contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
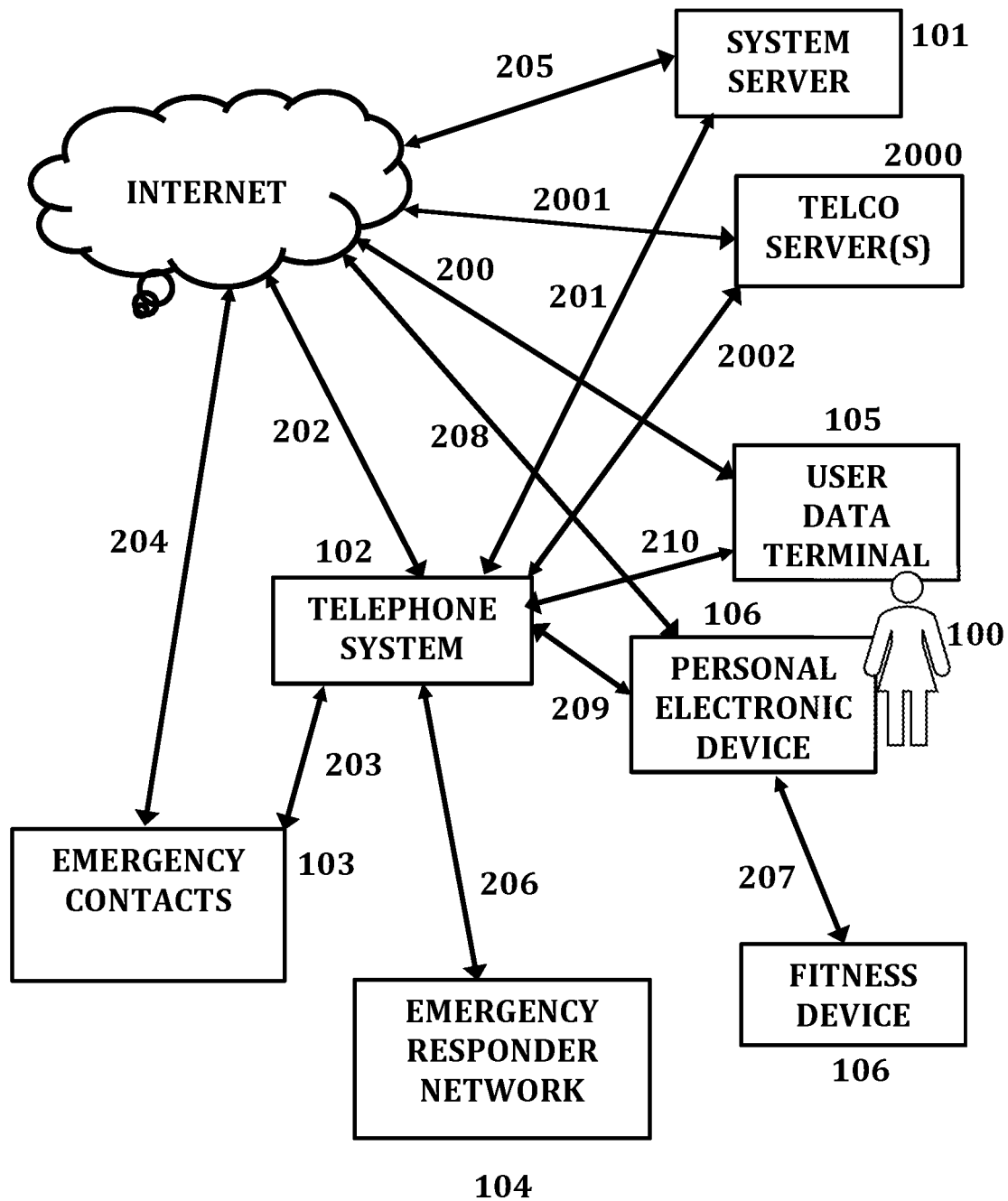
FIG. 1 depicts a system diagram of an embodiment of the personal protection system of the invention.

Referring now to FIG. 1, an exemplary embodiment of a system of the invention is depicted. A user 100 may access the system through any user data terminal 105 that is connected to the Internet by an Internet connection or equivalent connection 200.

User data terminal 105 may be any electronic device that is able receive user data entered by user 100 as described herein, and to communicate said user data with other electronic devices that are also connected to the Internet. Typically, user data terminal 105 may comprise a controller for executing non-transitory computer executable instructions stored in non-transitory computer readable media in communication with non-transitory physical computer readable media such as an electronic memory (shown in exemplary fashion as System Server Memory 1004 in FIG. 9), at least one data transceiver for transmitting and receiving data and audio information on links 200 and 210, a video display, and a user data input device such as a keyboard or touchscreen. By way of example, user data terminal may be a cell phone or other mobile phone, an electronic tablet, a personal digital assistant (PDA), a computer, including a laptop, desktop, or another type of computer, or any other electronic device.

In embodiments, personal electronic device 106 may be any electronic device that is able receive user data entered by user 100 as described herein, and to communicate said user data with other electronic devices that are also connected to the Internet; personal electronic device 106 may also comprise hardware and software to place and receive voice and other telephone calls and text messages, and personal electronic device 106 may also be in communication with a telephone system 102. Typically, but not necessarily, personal electronic device 106 may comprise a controller for executing non-transitory computer executable instructions, such as a software application stored in non-transitory computer readable media in communication with non-transitory physical computer readable media such as an electronic media, at least one data transceiver for transmitting and receiving data and audio information on links 208 and 209, a video display, and a user data input device such as a keyboard or touchscreen. A personal electronic device 106 may also comprise a geolocation receiver, such as a Global Positioning System (GPS) Receiver, for determining, storing, and communicating the personal electronic device 106's geographic location and producing an output signal containing the personal electronic device's geographic location information to the personal electronic device's controller. By way of example, user personal electronic device 106 may be a cell phone, mobile phone, an electronic tablet, a personal digital assistant (PDA) or any other electronic device. In embodiments, personal electronic device 106 may be any device capable of communicating with any telephone service for making and receiving calls, and is not necessarily a "smart device" comprising a controller. For example, such "non-smart" devices may be an analog telephone connected to any telephone systems such as a Plain Old Telephone System (POTS), any telephone connected to a telephone system landline, or any phone connected to any other type of telephone system that is able to place and receive telephone call. Such phones, for example, may be flip phones that do not comprise touch screens or microprocessors.

Server 101 may be any electronic device capable of connecting to the Internet and communicating with user data terminal 105 and user personal electronic device 106 via Internet connection 205, or, in the case in which user data terminal 105 or personal electronic device 106 is a mobile phone, via a telephone connection 201. Server 101 may comprise a controller for executing non-transitory computer executable instructions stored in server non-transitory computer readable media. The server non-transitory computer readable media is in communication with the server controller. Server 101 may also comprise as least one transceiver for transmitting and receiving data and telephone audio via links 201 and 205.

As used herein, "contact" includes within it's meaning an individual with whom a user plans to meet at an event.

As used herein, "event" includes within its meaning a geographic location, date and time where a user plans to meet a contact.

As used herein, "emergency contact" is a person, for example a third party, who has been designated by the user as a person to whom the user desires to send alarms, and who is able to send and receive voice and/or SMS messages in response to alerts transmitted by server 101.

As used herein, "first responder" and "emergency responder" are used interchangeably and include within their meaning any person entity such, for example, as a law enforcement agency, other government entity or non-government entity that provides emergency response to a person (i.e. a user) in distress. Examples are police or other law enforcement agencies, fire and rescue agencies, hospital or other health services providers, emergency medical transportation providers (e.g. ambulances), or any entity that provide personnel to assist, provide security, provide aid, or provide transportation to a user experiencing an emergency. First responders and emergency responders may be dispatched, for example, by an emergency dispatch system such as, but not limited to, the United States 911 and E911 systems or equivalent systems in non-U.S. jurisdictions.

As used herein, "alert" includes within its meaning an attempt taken by the system, for example through server 101, to contact a user by transmitting an alert to the user at a predetermined check-in time.

As used herein, "check-in" includes within its meaning an attempt by a user 100 to respond to an alert message transmitted by server 101.

As used herein, "escalate an alarm" includes within its meaning the transmission of an alarm message to at least one pre-determined emergency contact or to an emergency responder, or both.

As used herein, "SMS" means Short Message Service, and is alternatively designated as "text message" herein.

As used herein, "fitness device" includes within its meaning a device that comprises a wireless transceiver for communication with user data terminal 105 via any data communication link 207 such as an RF or optical data link, for example Bluetooth®, WiFi IEEE 802.11, Near Field Communication (NFC) or the like.

As used herein, "event information" includes within its meaning any, all, or any combination of date and time of an event, geographic location of an event such as physical address, user identifying indicia, or a contact's identifying indicia.

As used herein, "alert information" and "check-in alert information" may be used interchangeably and include within their meaning all parameters associated with the sending of an alert to be sent to the user by the system at a predetermined check-in time. Alert information may include the time for a check-in alert message to be sent to the user, the length of SNOOZE time if the user elects to SNOOZE an alert, the type of check-in alert such as voice call, SMS message, or other message, and all other parameters associated with the sending of an alert to be sent to the user by the system at a predetermined check-in time.

As used herein, "contact identifying indicia" includes within its meaning any, all, or any combination of the contact's name, the contact's photograph, the contact person's physical address, the contact person's email address, the contact's telephone number, close associates of the contact or other information helpful in identifying the contact.

As used herein, "user's identifying indicia" includes within its meaning any, all, or any combination of a user's name, age, physical address, email address, telephone number, photograph, or other user identifying information.

As used herein, "personal electronic device" includes within its meaning any device that is able to be carried by a user, i.e. any mobile electronic device such as, for example and not by way of limitation, a cell phone, electronic tablet, smart watch, headset or any other device that is able to connect wirelessly to a data communication network, such as, for example and not by way of limitation, the Internet or Internet-connected local networks via WiFi®, Bluetooth, or any wireless connection, whether RF or optical. A personal electronic device is capable of receiving and placing telephone calls. In embodiments, a personal electronic device is not necessary a "smart" device, in other words, it may be a flip phone or landline that is not necessarily able to send or receive messages other than telephone calls.

As used herein, "National E911 ALI Database" includes within its meaning any electronically accessible database that that contains a geographic location (sometime called the "911 address") for given phone numbers or DIDs: the geographic location is associated with the phone number or DID and this associate data is stored in the National E911 ALI Database. ALI stands for Automatic Location Identification. A National E911 ALI Database may be queried to obtain a caller's pre-stored location, using the caller's phone number or assigned DID to query the database to retrieve the associated geographic location information. For example, generally, if a caller directly dials a designated emergency contact number such as, for example, 911, to a local PSAP, then the local PSAP may query the National E911 ALI Database to provide location information for the caller's phone such that PSAP can dispatch first responders or emergency responders to the caller's location. The use of the National E911 ALI Database to provide the caller's location may reduce the first responder response time. The National E911 ALI Database may also return (i.e., provide) the proper location PSAP for a given user personal electronic device phone number or DID. Thus, the National E911 ALI Database may be queried using a user's personal electronic device phone number or DID, and the National E911 ALI Database may return the associated geographic information that is associated with that phone number or DID, and may also return the local location PSAP for which the associated geographic information is located within that location PSAP's jurisdictional boundaries.

As used herein, "alarm event geographic location" includes within its meaning any geographic location to which it is desired to dispatch first or emergency responders to assist a user in distress. Alarm event geographic location may be, for example, the geographic location of an expected meeting between a user and contact, or it may be the geographic location of the user's personal electronic device, or it may be a geographic location specifically designated by the user, or it may be a geographic location that is determined by the system and method of the invention using algorithms to process user, contact, event, and other information, or it may be any other geographic location communicated to the system of the invention.

As used herein, "user in distress" includes within its meaning any user that the system and method of the invention determines is in distress and likely in need of assistance. Such situations are, for example, but not limited to, users that fail to respond to check-in alert calls or messages, users that cause distress or alarm codes to be transmitted to the system server, users that cause reverse-PIN codes to be transmitted to the system server, and any other user that is determined by the system and method of the invention to be in distress.

As used herein, "software" includes within its meaning a set of computer readable and executable non-transitory instructions, stored in a physical storage media that is in communication with a processor or controller, for reading and executing such computer readable and executable non-transitory instructions by such processor or controller, typically forming part of a computer or server structure.

As used herein, "computer" and "server" include within their meaning any structure that is capable of reading, storing, an executing computer readable and executable non-transitory instructions. Typically, such computer and server structures may include physical storage media in communication with a controller or processor that is capable of reading and executing such computer readable and executable non-transitory instructions; a data input device enabling a user into input data into the computer for storage as non-transitory data stored in the physical storage media such as keyboard, touchscreen, microphone or other physical input device; an output device such as a visual monitor or display for visual display of data to a user, and transceivers for communicating wireless or in wired fashion to other computers, servers or systems. All the aforementioned components maybe in data communication with one another, in any combination, by a network of wiring, optical communication, backplanes, or other connection means as are known in the computer arts.

The method steps of the invention may be carried out any number or combination of servers, personal electronic devices and user data terminal controllers executing non-transitory computer executable instructions stored in non-transitory computer readable media in one or more system servers 101, personal electronic device 106, or in user data terminal 105.

A user may utilize user data terminal 105 to access system server 101 through Internet connection 200 to perform steps of the invention described herein; for example, logging in to the system, entering user identifying indicia, entering emergency contact information, entering check-in alert information, entering contact identifying indicia, entering event information, and so on. System server 101 may store this information, for example in a database comprising non-transitory computer readable media, for later retrieval and use, as described herein.

In embodiments, the invention may be carried out in several modes. In a first mode it is not necessary for a user to carry a personal electronic device 106, such as a cell phone, on their person. In a second mode, a user may carry a personal electronic device 106 on their person or keep it nearby, which allows the user to self-escalate an alarm event, respond to check-in alerts or perform other steps of the invention.

In either mode, once a user 100 has logged into the system server 101 and has provided the desired emergency contact, user, alert, event, and contact information, the user may log out and proceed about their business. In an embodiment of the invention it is not necessary that the user 100 carry a personal electronic device 106 or other communication device with them in order for the system and method of the invention to determine whether an alarm escalation is necessary. As is seen by the description of the invention provided herein, an aspect of this embodiment of the invention is that user 100 does not need to continue Internet access or telephone access, or any other communication, with system server 101 in order for the system a method of the invention to provide its notification functions. In the first mode, once the user 100 has entered their information into system server 101, they do not need to remain in contact with the server in order for the server to perform its alarm event notification functions.

In a second mode, user 100 may keep on their person a personal electronic device 106 that, in embodiments, is able to receive global positioning signal (GPS) information from a GPS satellite constellation. Thus, in this second mode of the invention, a user may carry an electronic device that includes a geolocation function such that the user's geolocation information stored on the device. In second mode, the user's device may communicate through Internet connection 200 to system server 101 and in a second mode embodiment, monitor the geo-location of a user so that the user 100's whereabouts and last location may be logged by system server 101 and reported to an emergency contact, first or emergency responder, or first or emergency responder dispatch system in the case that an alarm escalation event occurs. Alarm escalation events are described in further detail below.

System server 101, through its Internet connection 205, may also be in communication with a telephone interface, or telco system, 102, which may communicate directly 203 or indirectly with a telephone system via communication link 203 for the purposes of communicating with at least one pre-designated emergency contact 103. Telco system 102 may also interface with telephone systems that are Internet enabled through the telco internet communication link 202. In this manner, telco system 102 is operable to place telephone calls as needed, which may occur, for example, in the instance when an alarm escalation event has occurred. In such an event, system server 101 may communicate with telco system 102 to initiate telephone calls to pre-designated contacts identified by the user as emergency contacts, should an alarm escalation event. Likewise, system server 101 may communicate with telco system 102 to initiate telephone calls to an emergency responder network that may comprise any of the following, in any number, and in any combination, in communication with one another: a National E911 ALI Database 1001 (see FIG. 9); an E911 tandem interface 1003 (see FIG. 9); a Location Public Safety Answering Point (PSAP) dispatch system 1002 (see FIG. 9), and one or more first responders or emergency responders 1010 (see FIG. 9) such as law enforcement agencies, fire/rescue, Emergency Medical Technicians or the like, for example, via communication link 206, which may be any telephone network, data network, landline, wireless or wired connection, including but not limited to the Internet. Telephone interface, or telco system, 102 may communicate with a law enforcement agency or other emergency response system 104 by communicating an emergency message to an emergency response communication point. In the United States, the 911 and E911 dispatch systems are non-limiting examples of emergency response communication points. In these systems, the emergency response communication point is termed a Public Safety Answering Point (PSAP). In the United States, the invention may communicate with an emergency response communication point by dialing 911, which will cause local law enforcement to be dispatched to the user's geographic locatiOn using a 911 or Enhanced 911 (E 911) system. However, it is to be understood that the scope of the invention includes all such first or emergency responder dispatch systems, in any country or jurisdiction, regardless of the code used to dial the emergency response communication point, or the name by which it is called. All emergency response systems that are able to receive communication via an emergency response communication point, such as a PSAP, and to provide a resulting emergency response such as dispatch of first responders or emergency responders to a location such as the meeting or event location entered by the user into the system, are included within the scope of the invention.

A user 100 may carry on their person a personal electronic device 106 that is connected to the Internet or other network through communication link 208 and to a telephone network 102 through communication link 209. Both communication links 208 and 209 may be wireless and may be direct, or indirect, as is known in the art.

Figure 9:
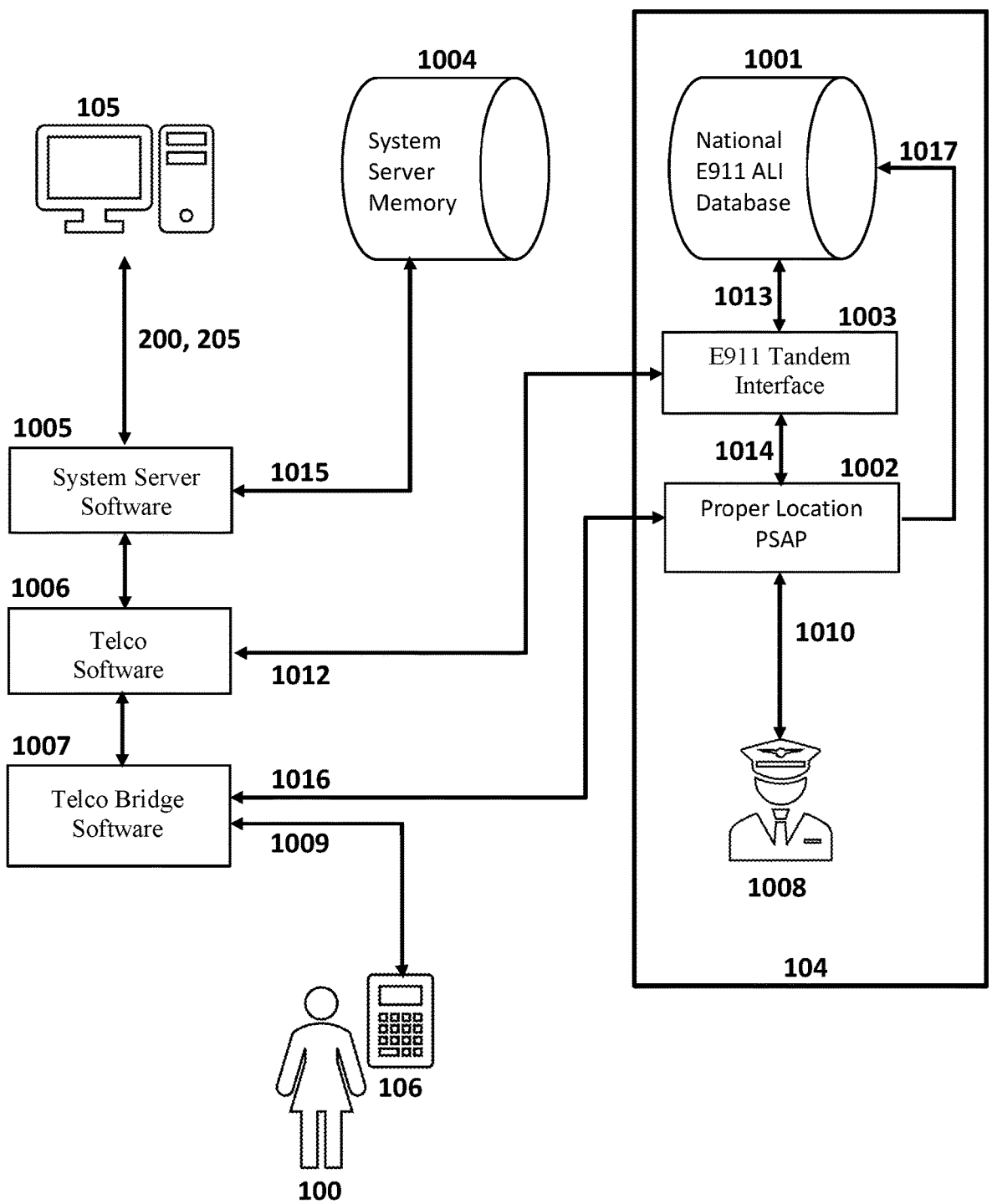
FIG. 9 depicts a block, or system, diagram of an embodiment of the invention that shows an exemplary system for communicating event information, including the user's personal electronic device phone number or DID, along with the geographic location information regarding a meeting location, or geolocation information for locating the user's personal electronic device, or both, to an emergency or first responder network such that first or emergency responders may be dispatched to the meeting location or to the geographic location of the user's personal electronic device, without the need for any interaction with the user, and without the need for services of any call center.

Still referring to FIG. 1, in embodiments, the system may comprise one or more Telco Servers 2000 that may be in data communication with system server 101 via a wired or wireless connection to the Internet 2001, and may also be in communication with telephone system 102 via a wired or wireless connection 2002 such that voice calls may be placed, received, and bridged by telco software (such as telco software 1006 and telco software 1007 depicted in FIG. 9) residing in physical media connected to one or more processors located on telco server(s) 2000 for executing such software. In embodiments, telco software 1006 and telco software 1007 may reside on system server 101. Telco software 1006 may also include text-to-speech functionality, for example using Speech Synthesis Markup Language (SSML), implemented in software running on telco server 2000, system server 101, or another computer or server that is in communication with telco server 2000 or system server 101, or both.

Figure 2:
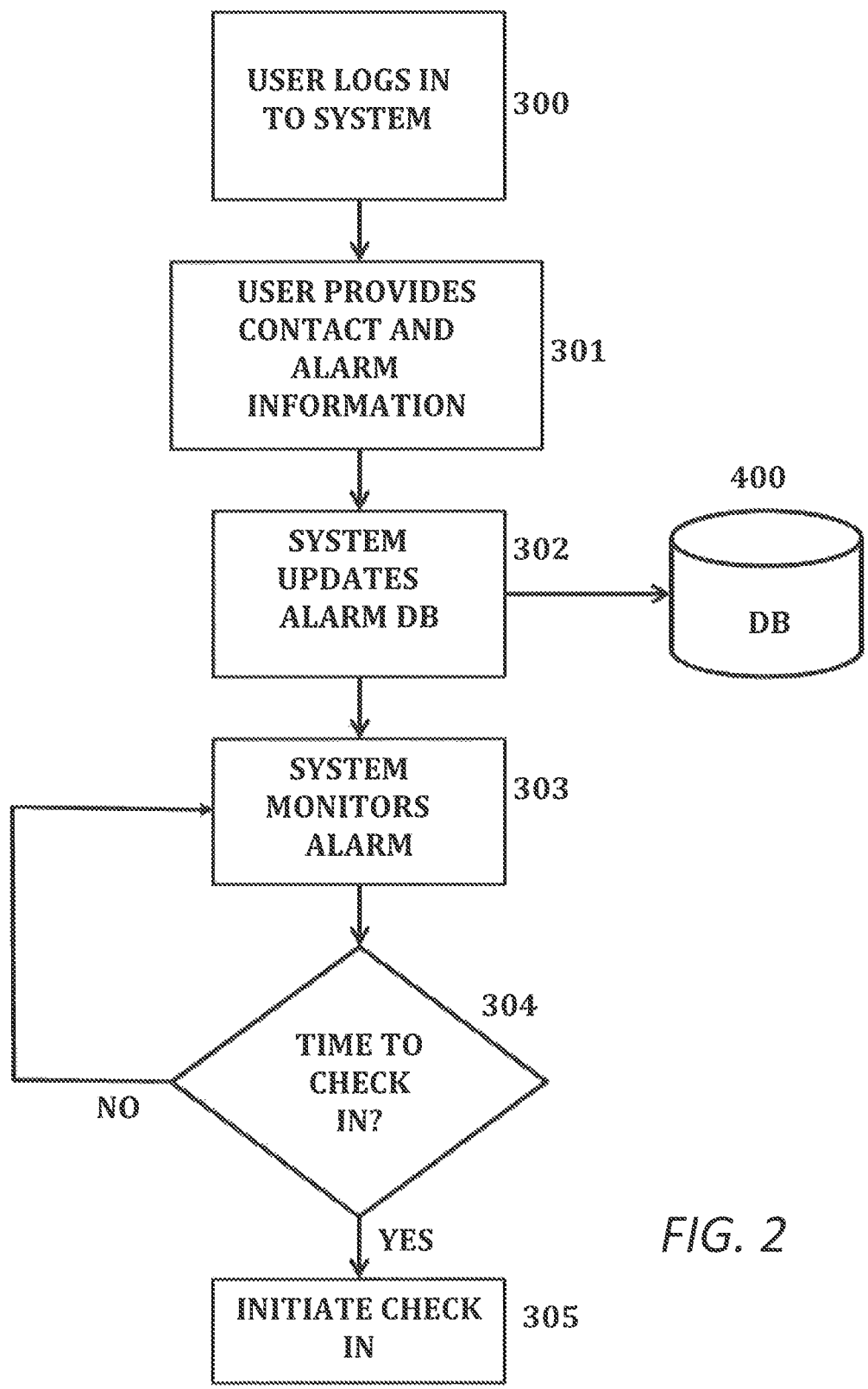
FIG. 2 depicts a flowchart of an embodiment of the system of the invention, depicting the user login step; step of user identification of alarm information contacts, plans for meetings and the like; step of updating the alarm database; step of system monitoring alarms; and the steps related to verifying whether it is time for a user to check in and initiating the check-in procedure.

Referring now to FIG. 2, a flowchart of an embodiment of the system of the invention, depicting the user login step; step of user identification of alarm information contacts, plans for meetings and the like; step of updating the alarm database; step of system monitoring alarms; and the steps related to verifying whether it is time for a user to check in and initiating the check-in procedure is depicted.

In a first step 300, a user may log into the system of the invention via, for example, a user data terminal such as 105 (see FIG. 1) that may be any mobile or other electronic device, using login credentials that provide protection, such as password protection, the prohibit unauthorized access to a user's account but allows a user their own account for the purposes described below. Once a user has logged into the system, they may enter information to the system that will be stored by the system and utilized for the various system functions as herein described 301. For example, and not by way of limitation, the type of information provided to the system by a user may include but not be limited to:

their own identifying information such as name, address, date of birth, physical characteristics such as height and weight in color of hair, race, photograph of themselves, or any other identifying information;
a personal identification number, or PIN;
password for disarming;
alert information comprising information related to a time for the system to check in with the user;
identification of persons with whom the user may be meeting (i.e., the contact) which may include name, telephone number, address, identifying physical characteristics, type of car driven, license plate number, telephone number, email address and any other identifying information;
description of the type of meeting;
event information such as geographic location of the meeting, such as but not limited to a street address or Global Positioning System (GPS) or other geolocation coordinates;
description of the method that will be used by the system to perform check-in alert with the user, and any other information regarding alerts;
identification of persons (third parties) to be contacted in case an alarm event is escalated, and the method by which those persons should be contacted;
any other information related to the manner in which an identity to whom alerts should be sent by the system of the invention; and
distress or alarm codes.

In a next step 302, the system of the invention stores the information provided by user 100 by any means known in the art. Specifically, alert information may stored in alarm database 400, which may also be stored in non-transitory computer readable media.

The method of the system of the invention may be carried out by any means known in the art. In an embodiment of the invention, the method of the invention may be carried out by non-transitory computer readable and executable instructions stored in non-transitory computer readable media that is in electrical communication with, or forms a part of, system server 101. It is not necessary that the non-transitory computer readable media be co-located with system server 101. System server 101 may comprise any system that is capable of executing computer readable instructions to perform the method steps described herein. System server 101 may further comprise communication means such as communication transceivers, which may communicate wirelessly or in wired fashion, as is known in the art, to communicate through the Internet and with the other elements of the system as identified herein. Likewise, user 100 may utilize any electronic computing device or other device to communicate with system server 101 as described herein. As an example, user 100 may use a personal computer, cell phone, tablet computer, personal digital assistant, or any other electronic means known in the art capable of communicating with the Internet via communication link 200 so that it can communicate with system server 101 to provide the steps described herein. The steps herein may be embodied in non-transitory computer readable and executable instructions implemented in a computer language such as, by way of example and not by way of limitation, JAVA. Thus, in embodiments of the invention, the method steps described herein may be carried out in a web browser API or may be carried out in a mobile device application resident on a user's mobile computing device such as cell phone, tablet computer, or the like.

Still referring to FIG. 2, the next step 303 the system of the invention may execute instructions to read alert information from alarm or alert database 400 such that it monitors the passing of time and compares the present time to the time allocated for check-in that has been entered by the user as hereinbefore described and stored in alarm or alert database 400. When time arrives for the system to check in with a user 304, the system initiates check-in procedure 305. If time has not yet arrived for the system to check in with the user, the system continues to monitor the passing of time and compare the present time to the time allocated for check-in that has been entered by the user.

Figure 3:
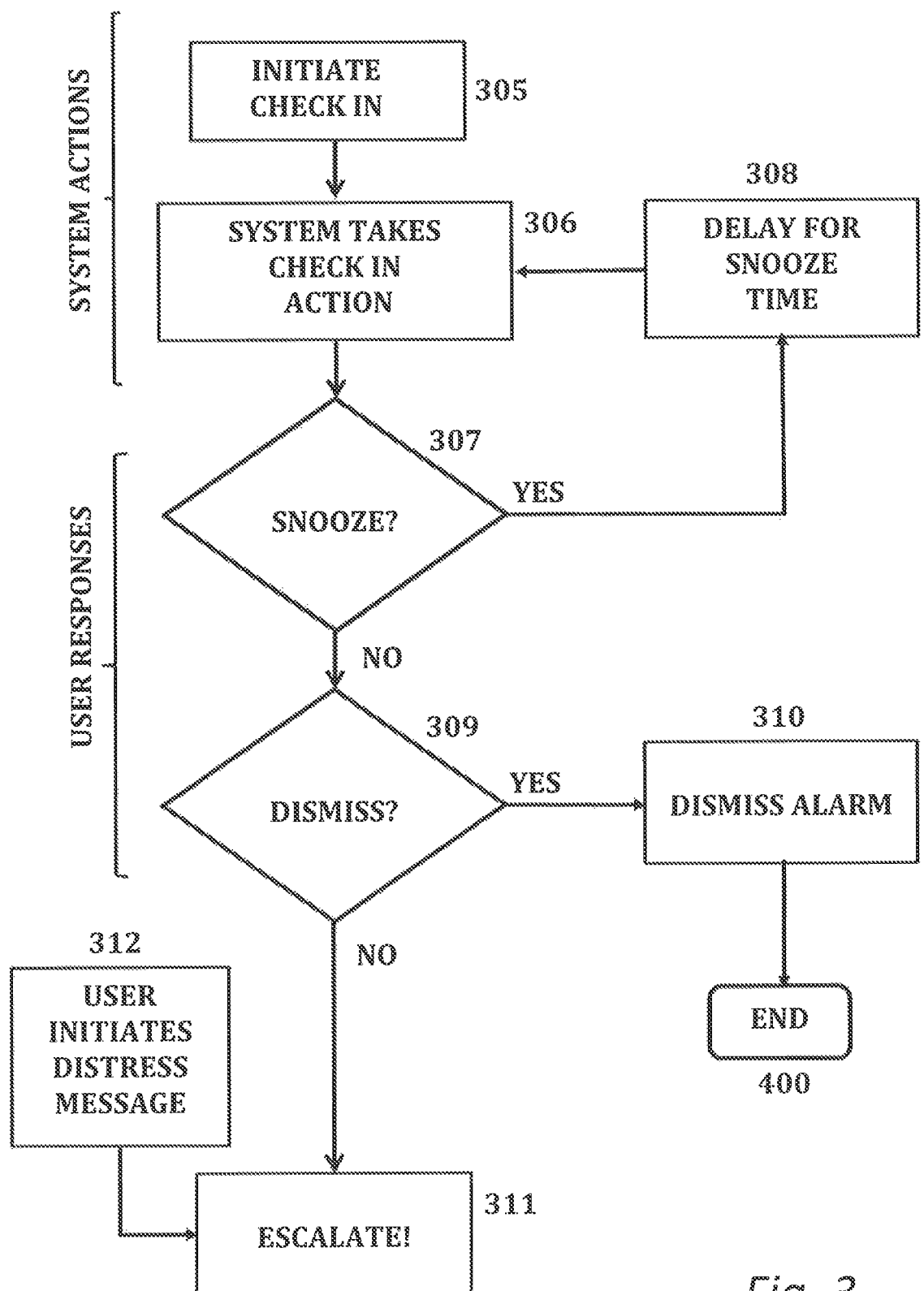
FIG. 3 depicts a flowchart of an embodiment of the system of the invention, depicting the predetermined action steps and the system responses to possible user replies, including a no-reply condition.

Referring now to FIG. 3, once time has arrived to initiate check-in procedure 305, in a next step 306 the system reads from non-transitory computer readable media the instructions created by the system when the user entered alert information in step 301 and executes those instructions to perform the steps as entered by the user in step 301 (not shown in FIG. 3, but shown in FIG. 2). These steps may be, but are not limited to, any of the following: 1) place a phone call to the user; or 2) send a text message or other message to the user.

Still referring to FIG. 3, the system proceeds as desired by the user to place a check-in alert phone call to the user, send a check-in alert text message to the user or to check in with the user in any other means identified by the user 306. The system then waits for either the user to answer the check in alert call or message (which may be more than one check in calls or messages placed over time, such as a series of one or more calls or messages spaced apart in time by a predetermined amount of time, which predetermined amount of time may be programmable and may be entered into the system by the user), for a designated time period. The designated time period may be programmable to a predetermined value which may be one of the alert characteristics entered into the system in step 301. In the user does not answer the check in call or message, the system may wait for a response by waiting to receive a return phone call or text from the user. In embodiments, the user may be required to enter their PIN in the case where a return text has been selected as the user's choice for responding to the check-in call or message transmitted by the system. Thus, if the user is in distress, an adverse party cannot respond to the check-in message unless they know the user's PIN, without triggering the system to escalate an alarm event. If the user is forced by an adverse party to provide or enter their PIN, they may provide or enter a distress or alarm code, which could be, for example, their PIN in reverse order of digits as one example of a distress or alarm code, to signal to the system of the invention that they are in distress, thus triggering escalation of an alarm event by the system.

Still referring to FIG. 3 there are at least four possible user responses to a check-in alert call or message from the system. First, the user may select to respond with a SNOOZE message 307. When the system receives a SNOOZE response from a user, the system will set a timer, delay for a specific time 308, and repeat the check in alert action 306. This feature is useful in the case when a meeting has taken longer than the user had anticipated but there is no distress or other danger to the user, and the user wishes the system to check back in with them at a later time. Secondly, the user may elect to respond to the check-in alert call or message with a DISMISS response. When the system receives a DISMISS response from a user 309, the system dismisses the check-in alert or alarm 310 and the check-in sequence ends for the subject alert or alarm 400. It is to be noted that a user may have a plurality of alarms having check-in alerts running at any given time, each with their own parameters as may be entered in step 301. The user may enter any number of check-in alerts or alarms, each having similar or different alert information, in step 301. Thirdly, when the system receives a directly initiated DISTRESS or alarm message 312 from a user, such as when the user enters a distress or alarm code into their personal electronic device 106, the system immediately escalates an alarm event. The system may receive a directly initiated distress or alarm code 312 by a user providing or entering a distress or alarm code into personal electronic device 106 whereupon that distress or alarm code is transmitted to server 101, or by a user entering their reverse PIN in response to a check-in message, or by a user activating or selecting a touchscreen button on, or entering a voice command into, a personal electronic device 106 such as a cell phone, tablet computer, PDA or other device that is connected to the Internet and is capable of executing non-transitory computer readable instructions stored in non-transitory computer reader media to perform the steps described herein. In such cases, the distress or alarm coded is transmitted by the personal electronic device 106 to the system server 101, allowing the system to determine that an alarm event has occurred. A fourth potential response from the user is NO RESPONSE. When a user does not respond to a check-in alert message or check-in alert call provided by the system within the time allowed for response, an alarm event 311 may be escalated by the system. Generally, the system of the invention may use any combination of information input by the user; any interpretation of information input by the user; any interpretation of information related to the contact with whom the user was expected to meet whether or not such information is provided by the user; any information related to the geographic location of an expected meeting; any environmental information related the time and location of the expected meeting with a contact (for example, extreme weather at the time of the expected meeting), whether or not provided by the user; any information about the contact, whether or not provided by the user; any information regarding the user's personal electronic device 106 (such as, for example and not by way of limitation, device geographic location, state of battery charge, cell tower connection strength and history, or other personal electronic device 106 parameters, operation, and connectivity) or other information regarding either the user, the contact or the event location, from any source, and in any combination, to determine that a user may be in distress, or to determine a likelihood or probability that a user may be in distress. The above exemplary types of information that may be used by the system to determine that a user is in distress may come from the user, or from the system's inquiry of other information systems. Such inquiry may be initiated by the system, without interaction by the user. All of the above examples, which are not exhaustive, are exemplary of ways in which the system of the invention may determine that an alarm event has occurred; i.e., that a user is in distress, or may be in distress.

The system responds to an alarm event escalation by taking the steps entered by the user when the user established the alarm in step 301 (not shown in FIG. 3 was shown in FIG. 2). Alarm event escalation steps may include telephone contact with a person or persons designated by the user, telephone contact with law enforcement, emergency telephone contact such as 911 or E911, or any other contact via electronic means such as Internet connection or by telephonic means such as telephone or other connections. In this manner, the system will alert the person or persons, including but not limited to personal contacts in law enforcement, designated by the user when the user establishes the alarm information in step 301. The server may effectuate these communications automatically, or may provide a message to a call center that is manned by individuals who may place telephone calls, text messages, and other communications as was designated by the user when the user establish the alarm information instead of 301.

In the case where system and method of the invention are implemented in a software application comprising non-transitory computer executable instructions stored in computer readable media on a user's mobile computing device, a password may be required to gain entry to the application. This password may be separate from the user's PIN. Thus, in this embodiment of the invention, the system may not be disarmed by simple entry of a password; the user PIN must be used to disarm the alarm.

Figure 4A:
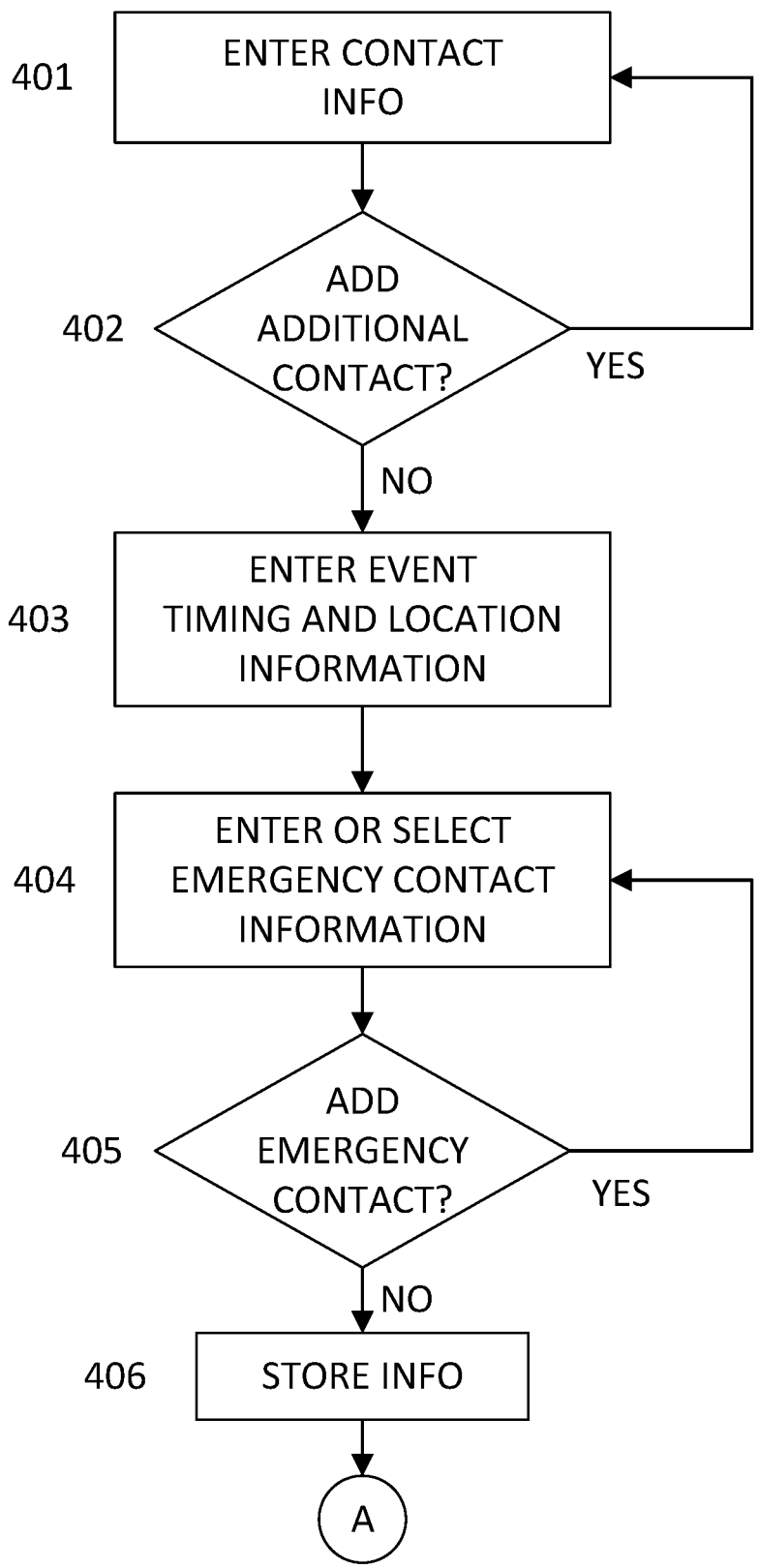
FIG. 4A depicts a flow diagram of steps of the invention for entering contact information.

Referring now to FIG. 4A, a flow diagram of steps of the invention for entering contact information is depicted in further detail. In step 401, a user indicates that he/she desires to enter contact information, and enters the identifying indicia for the contact. In the next step 402, the user is queried if more than one contact is desired to be entered. This would occur, for example, when a user has scheduled an event, such as a meeting, with more than one person. If it is desired to enter more than a single contact for an event, the user answers YES and proceeds to enter the additional contact's identifying indicia. This process is repeated until all contacts' identifying indicia have been entered, whereupon the user will answer NO to the query of step 402. Next, in step 403, event information is entered. Once event information has been entered, emergency contact information is entered directly, or selected from a pre-stored contact database, in step 404. As it is possible to enter more than a single emergency contact for an event, the user is queried in step 405 if there are additional emergency contacts to enter. If the user indicates YES, additional emergency contact information is entered until all emergency contacts have been entered, whereupon the user will respond NO to the query of step 405. In step 406, all data entered by the user is stored in non-transitory media that is either a part of, or in communication with, server 101.

Figure 4B:
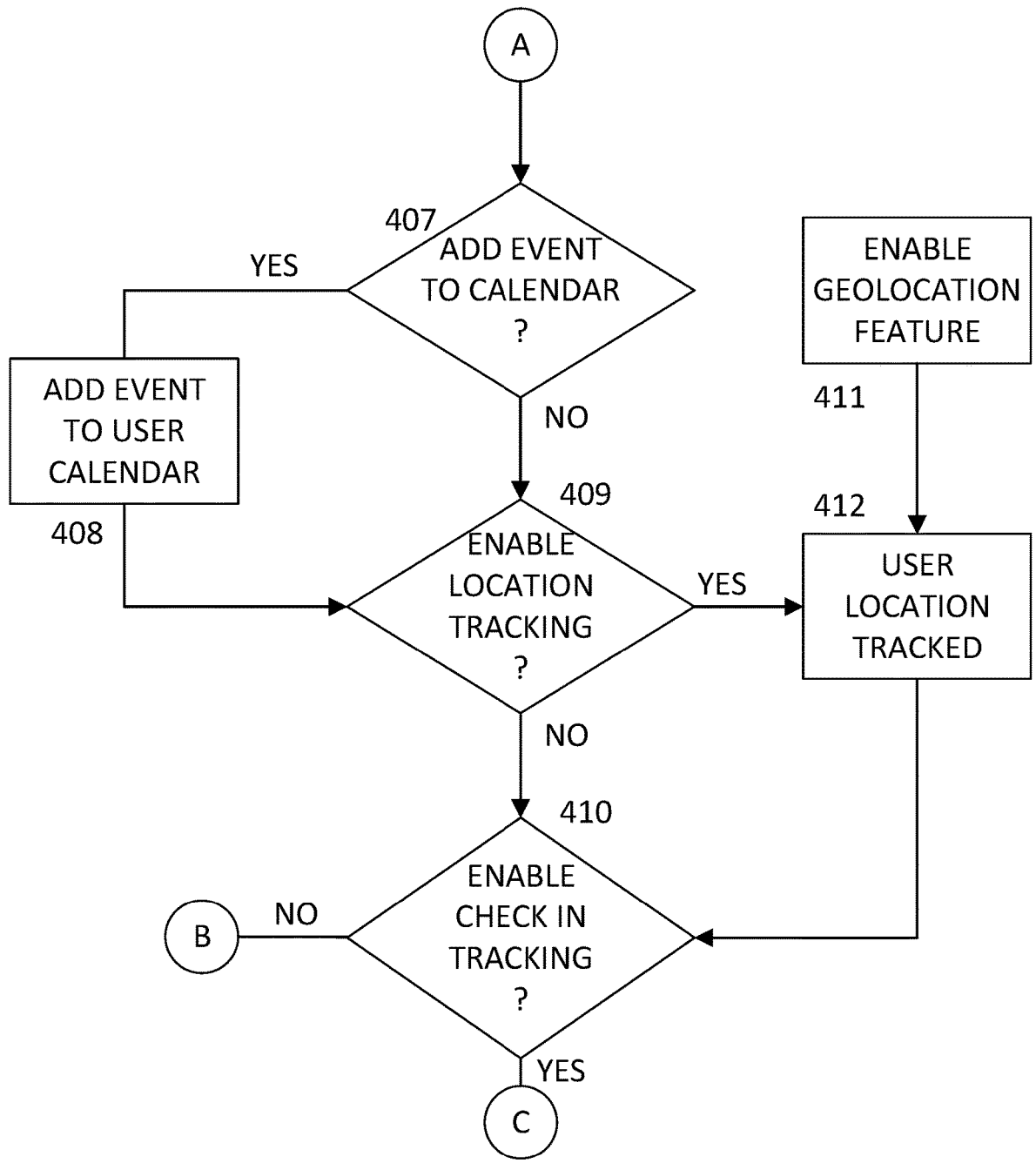
FIG. 4B depicts a flow diagram of steps of the invention for adding events to a user's electronic calendar and for enabling geolocation tracking.

Referring now to FIG. 4B, a flow diagram of steps of the invention for adding events to a user's electronic calendar and for enabling geolocation tracking is depicted. It is known in the art that many, if not most, computers, cell phones or other mobile electronic devices are equipped with calendaring functions allowing a user to store calendar events. These calendaring functions typically also provide an option for alerting a user prior to a calendared event so that the user does not miss an event. In step 407, user 100 is presented with a query as to whether the user desires to add an event to the user's electronic device 106 calendar. For example, if the user has entered an event using user data terminal 105, the query will ask whether user 100 wishes to add the event to the user's calendar function residing on the user's cell phone. User 100 may indicate YES, in which the event information is added as a calendar event to the user's electronic calendar residing on user data terminal 105 in step 408. If user 100 indicates NO, no calendar information is stored in the user's electronic calendar. Further, a user may enter an event by selecting a calendar entry that has previously been stored in the user's electronic calendar. In such a case, the calendar data is provided to the system to establish an event, and to establish a check in time. In step 409, the user is queried as to whether geolocation tracking is desired. Geolocation tracking may be provided by any means such as Global Positioning System (GPS) receivers integrated into user data terminal 105, triangulation using radio frequency communication links, or any other geolocation means. If user 100 indicates YES to the inquiry of step 409, and if the geolocation function of personal electronic device 106 has been enabled in step 411, personal electronic device 106 begins to communicate personal electronic device 106's geographic location information to server 101, whereupon server 101, in step 412, maintains information identifying the geolocation of user 100. This information may be stored and utilized to analyze personal electronic device 106's physical movements over time. It may be assumed in most cases that user 100 and personal electronic device 106 are co-located; as would be the case, for example, if personal electronic device 106 is a mobile phone and is being carried on user 100's person. In step 410, user 100 may be presented with a query as to whether user 100 desires server 101 to monitor user 100's geographic location and to take certain actions when user 100 arrives at the event location, or in proximity thereto, or when user 100 leaves the event location. If user 100 desires such check-in tracking, he/she indicates YES to the query of 410; if user 100 does not wish actions to be taken by server 101 upon their arrival at or near the event location, or their departure from the event location, they indicate NO to the inquiry of step 410.

Figure 4C:
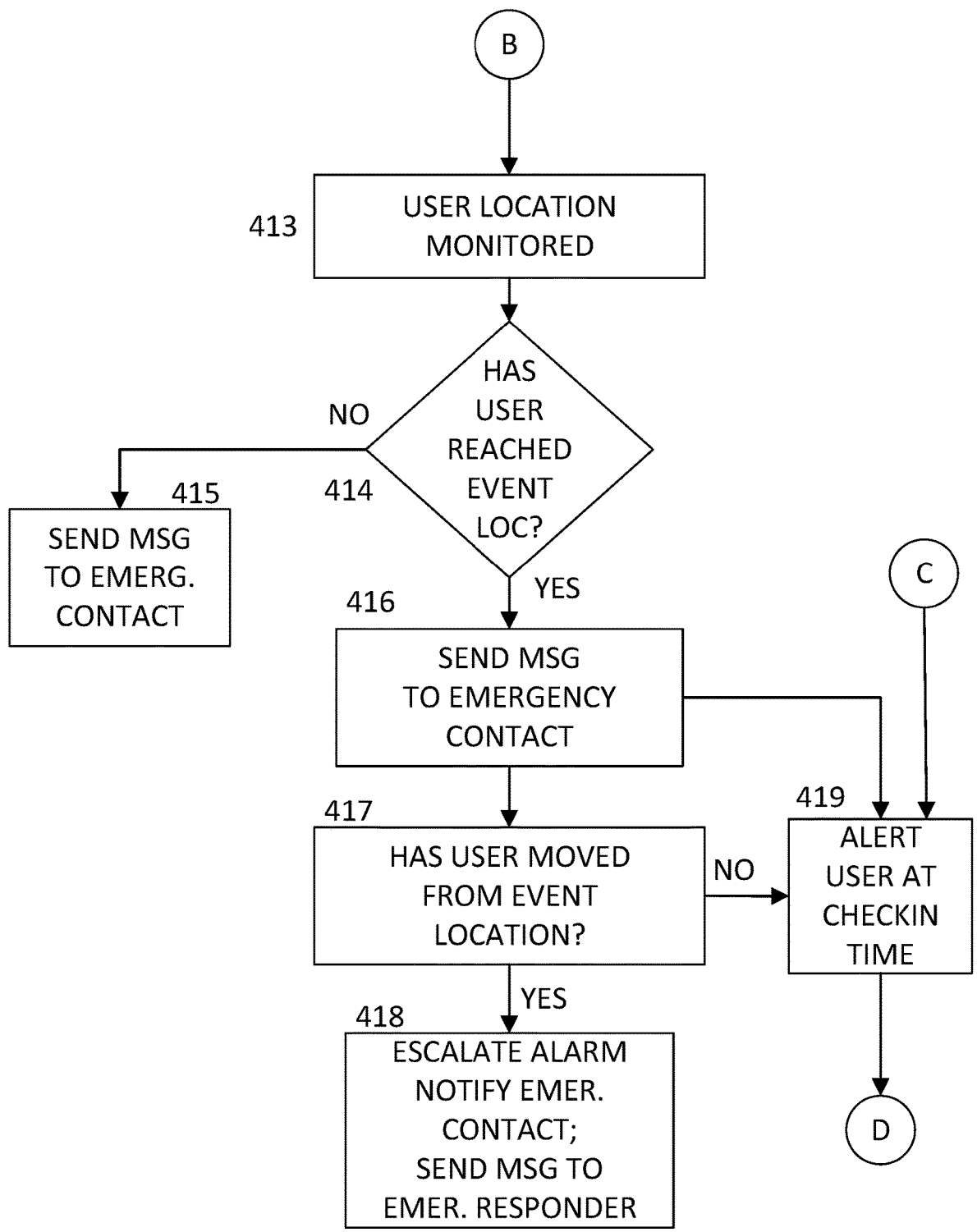
FIG. 4C depicts a flow diagram of steps of the invention for monitoring whether a user has arrived at, or moved from, an event location.

Referring now to FIG. 4C, a flow diagram of steps of the invention for monitoring whether a user has arrived at, or moved from, an event location is depicted. If a user has indicated YES to the inquiry of step 410, the user's geographic location is transmitted from personal electronic device 106 to server 101, whereupon server 101 monitors user 100's geographic location in step 413. User 100's geographic location is monitored by server 101 to determine whether user 100 has arrived at or near a scheduled event location in step 414. If user 100 has not reached a scheduled event location within a predetermined time of the event, a message indicating that user 100 has not arrived at an event location is transmitted to the at least one emergency contact for that event in step 415. If user 100 does arrive at an event location within a predetermined time of the scheduled event, server 101 transmits either an SMS or pre-corded audio telephone message to the designated emergency contacts for that event in step 416, indicating that user 100 has arrived at the designated event location within a predetermined time of the scheduled event. This provides confirmation that user 100 has arrived for their event as expected. Server 101 continues to monitor user 100's geographic location. If user 100 does not move from the event location 417, server 101 transmits a check-in alert to user 100 in step 419. If user does move from the event location 418, server 101 may escalate an alarm by transmitting an alarm message to the designated emergency contacts for that event and also transmits an emergency message to an emergency responder using, for example, 911 or E911 if in the United States or other jurisdiction using such emergency codes.

Figure 4D:
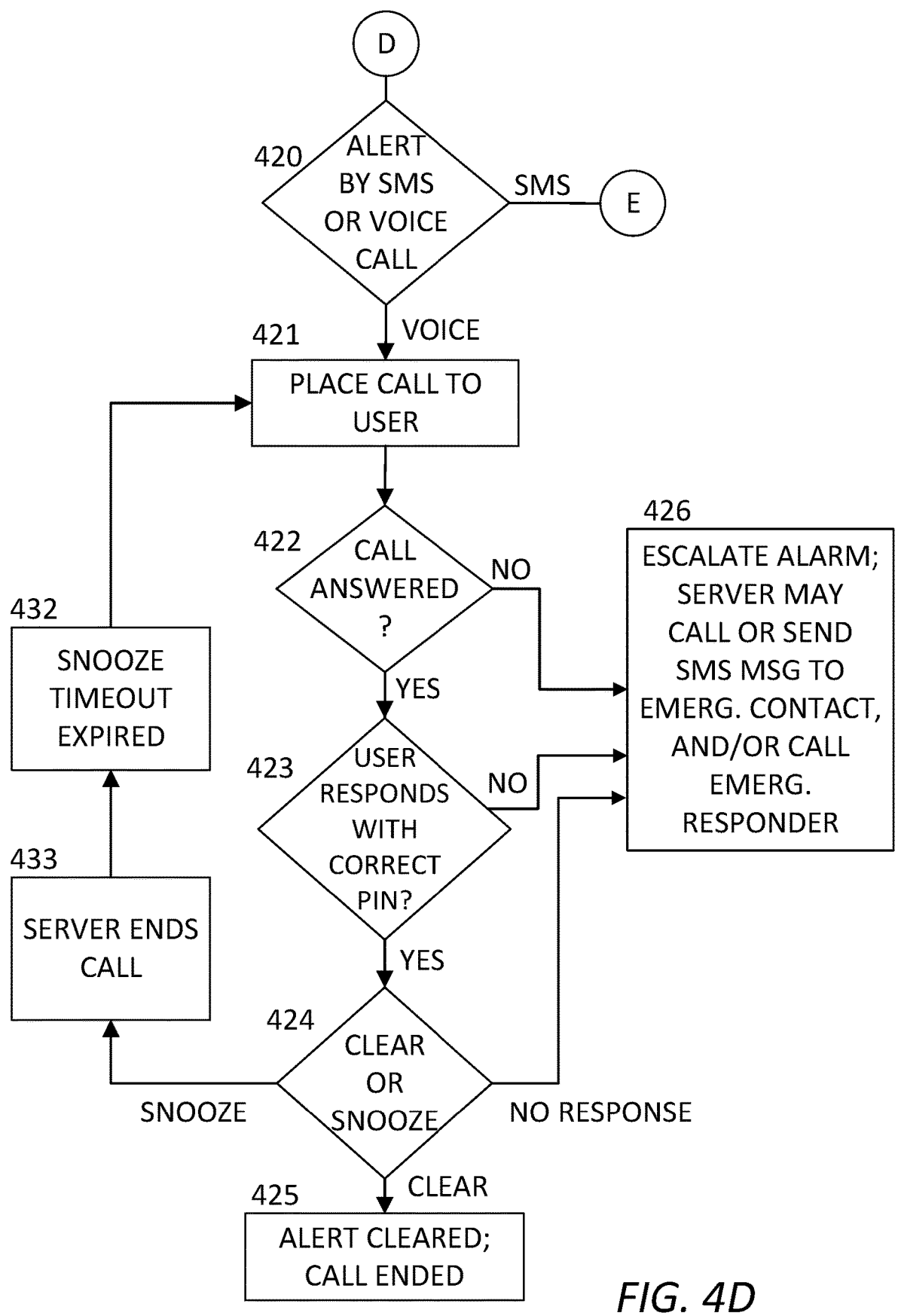
FIG. 4D depicts a flow diagram for check-in with a user by calling a user's cell phone.

Referring now to FIG. 4D, a flow diagram for check-in with a user by calling a user's cell phone is depicted. When it is desired to check-in in the case in which a user is carrying, or has access to, a personal electronic device 106 that is capable of receiving voice calls, such as a cell phone, landline, flip phone, tablet or other device, the server decides, in step 420, whether to check-in with a user using a voice call or non-voice message such as, for example, an SMS or text message. In the case where server 101 elects to check-in with the user by voice call, it will place a voice call 421 to the user's personal electronic device 106. If user 100 answers the call, step 422, the user may be presented with a pre-recorded message requesting that the user enter their PIN into the personal electronic device 106 data entry feature, which may be, for example, a keypad or touchscreen, or may be a microphone receiving voice input with associated software running on the device to convert the received voice audio input to electronic data for processing and storing by the personal electronic device 106's controller or processor. The entered PIN is then transmitted to system server 101 by personal electronic device 106. If user 100 enters the correct PIN, the system may clear the check-in alert or alarm, or may present the user with an option to clear the check-in alert alarm by entering a code using the personal electronic device 106's input feature, or may present the user with an option to elect to SNOOZE for a pre-determined period of time, for example fifteen minutes, by entering a specific code into the personal electronic device 106 input feature. For example, the user may be presented with an audio message stating "to clear check-in alert, press 1: to snooze for fifteen minutes, press 2". If user 100 enters the code "1" to clear the alert, the user's personal electronic device 106 transmits the clear code to server 101, whereupon server 101 clears the alert and ends the call 425. If user 100 enters the code "2" for SNOOZE, the user's personal electronic device 106 transmits the snooze code to server 101, whereupon server 101 ends the call in step 433, waits for the SNOOZE timeout period to expire in step 432, and returns to step 421 at the end of the pre-determined SNOOZE time, repeating the call-based check-in process. If user 100 fails to answer the check-in call in step 422, or if the user does not respond with the correct PIN (or enters an incorrect PIN after a predetermined number of attempts, for example three attempts, or enters a distress or alarm code) in step 423, or 424 user 100 fails to respond to the request to the user to either enter a code for clearing the alert or enter a code for electing to SNOOZE, an alarm event is escalated in step 426, in which server 101 may transmit a non-voice message or place a phone call, or both, to the at least one emergency contact, and may also place a call to an emergency responder such as via an E911 interface as described elsewhere herein, whereupon a voice message may be played to the emergency responder system providing any one or more of the following, in any combination, and in any order: the user's identity, the event information (including event geographic location information), the geographic location of the user's personal electronic device) and contact information.

Figure 4E:
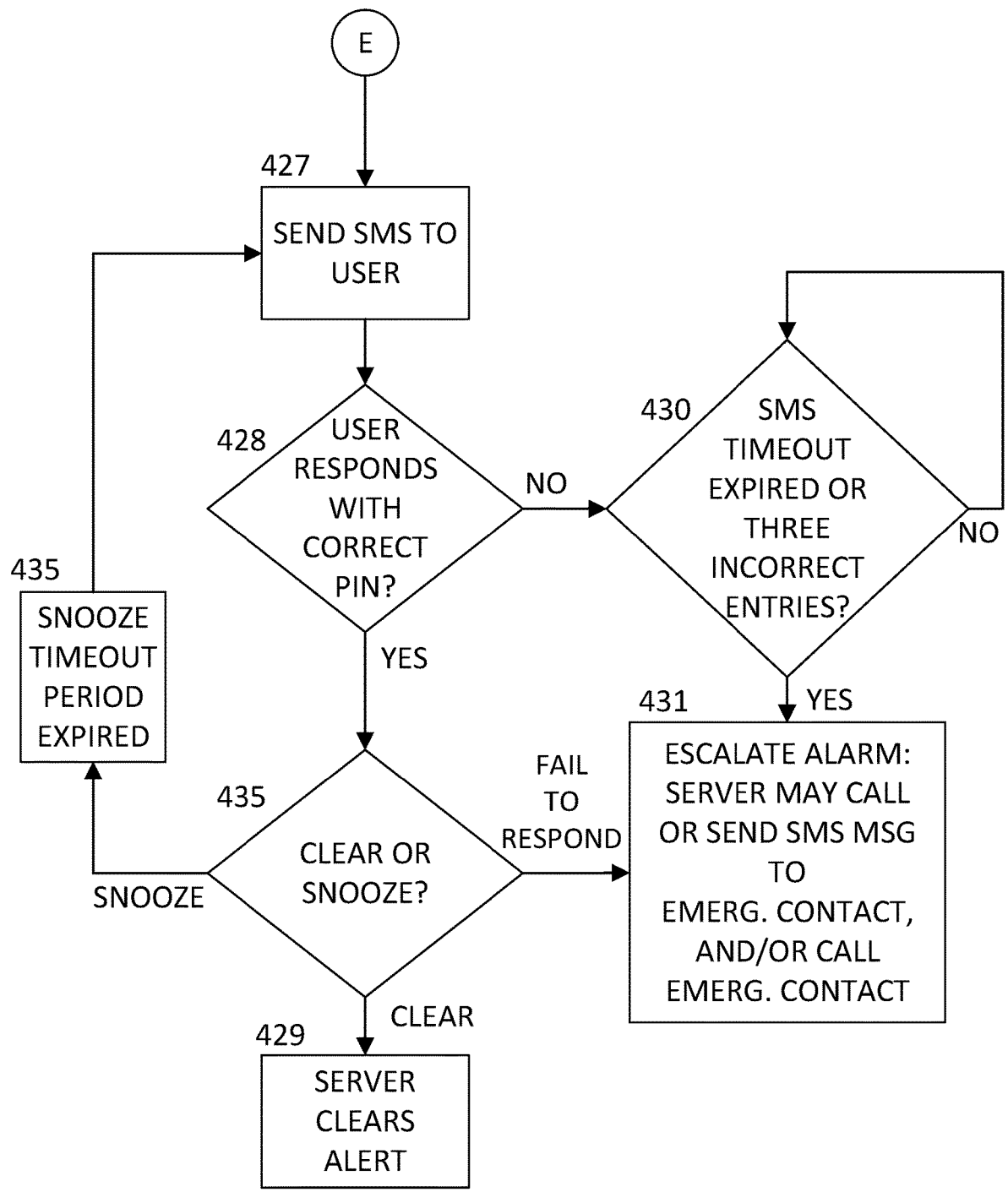
FIG. 4E depicts a flow diagram for check-in with a user by sending a message such as an SMS message or prerecorded voice message to a user's personal electronic device, which may be any electronic device capable of receiving the message such as a cell or mobile phone, tablet or other electronic device.

Referring now to FIG. 4E, a flow diagram for check-in with a user by messaging a user's personal electronic device 106 is depicted. When it is desired to check-in with a user in the case in which a user is carrying, or has access to, a personal electronic device 106 that is capable of receiving non-voice messages such as SMS or text messages, for example a personal electronic device 106 or other device, server 101 may elect to check-in with user 100 by transmitting a non-voice messages such as an SMS message to the user's personal electronic device 106. In the case where server 101 elects to check-in with the user by non-voice message, it may transmit a non-voice message to the user's personal electronic device 106, step 427, prompting user 100 to enter a PIN into an input feature of user 100's personal electronic device 106. If user 100 enters the correct PIN in step 428, 435 the user's personal electronic device 106 may transmit the code to server 101, whereupon server 101 may clear the alert in step 429; or, in an alternate embodiment, server 101 may transmit an SMS message to the user, presenting user 100 with an option to enter a code to elect to clear the alert by entering a specific code into the personal electronic device input feature, or to elect to SNOOZE for a pre-determined period of time, for example fifteen minutes by entering a specific code into the personal electronic device keypad. If user 100 enters the SNOOZE code into the personal electronic device input feature in step 436, the user's personal electronic device 106 transmits the snooze code to server 101. For example, the user may be presented with an SMS or other message on a visual display of user personal electronic device 106 stating "to clear check-in alert, press 1: to snooze for fifteen minutes, press 2". If user 100 enters the code "1" to clear the alert, the user's personal electronic device 106 transmits the clear code to server 101, whereupon server 101 clears the alert. If user 100 enters the code "2" for SNOOZE, the user's personal electronic device 106 transmits the snooze code to server 101, server 101 may wait for a predetermined SNOOZE timeout period to expire in step 435, then return to step 427 at the end of the pre-determined SNOOZE time, repeating the non-voice-based check-in process. If user 100 fails to respond with the correct PIN in step 428, or enters an incorrect PIN after a predetermined number of attempts, for example three attempts in step 430, or if user 100 enters a distress or alarm code, or if user 100 fails to respond to a request to the user to either enter a code for clearing the alert or enter a code for electing to SNOOZE, an alarm event may be escalated in step 431, in which server 101 may transmit a non-voice message or place a phone call, or both, to the at least one emergency contact, and may also place a call to an emergency responder such as via an E911 interface as described below, whereupon a voice message may be played to the emergency responder providing any one or more of the following, in any combination, and in any order: the user's identity, the event information (including but not limited to event geographic location information), the geographic location of the user's personal electronic device) and contact information.

Figure 5:
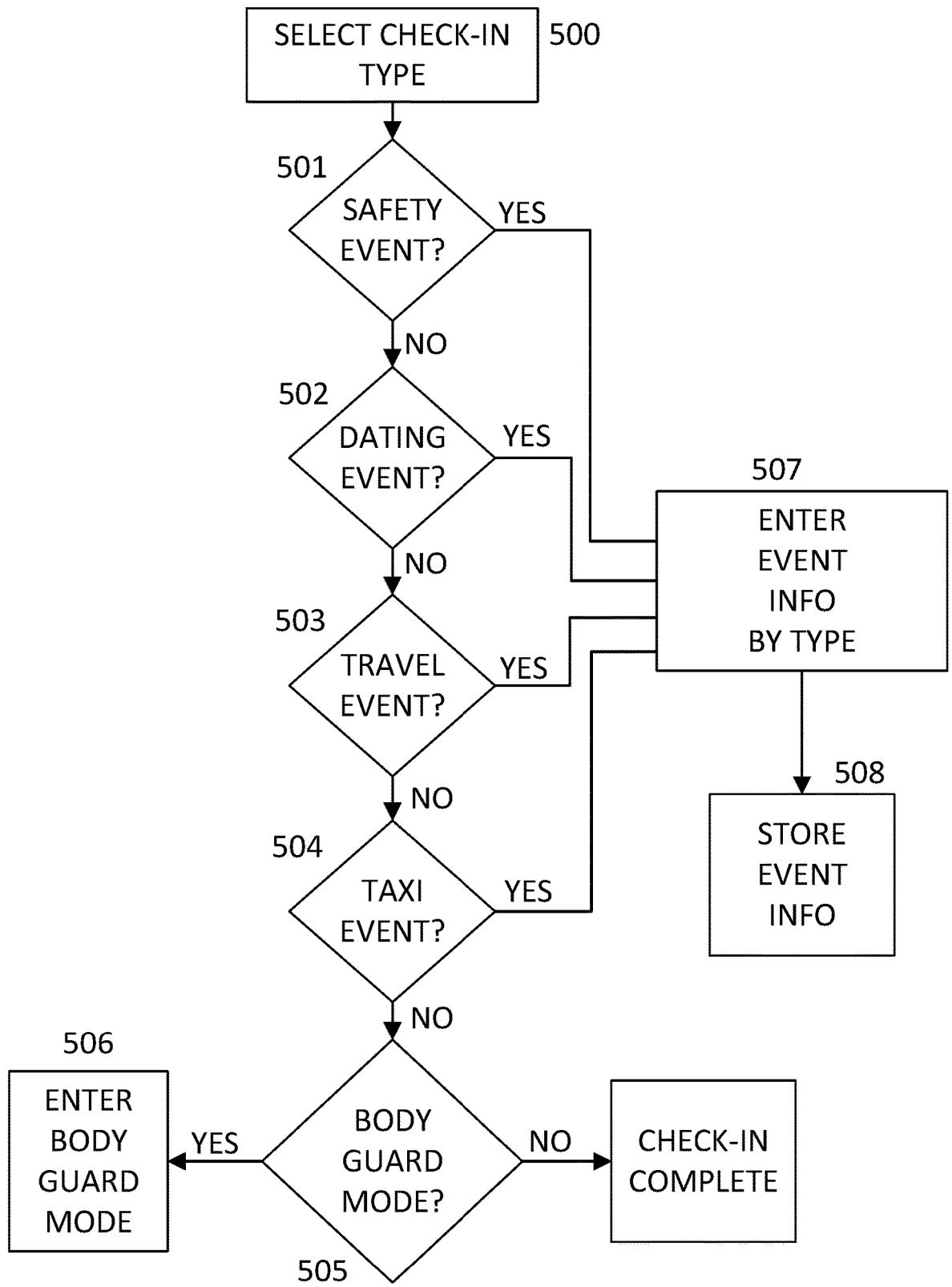
FIG. 5 depicts a flow diagram for selecting an embodiment of the invention in which a user may designate an event type is depicted.

Referring now to FIG. 5, a flow diagram for selecting an embodiment of the invention in which a user may designate an event type is depicted. In an alternate embodiment, the invention may provide a user 100 with the ability to designate the type of event that is being scheduled. These event types may have differing characteristics such that the invention may enable a user to store different types of relevant information for each type of event. For example, event types may be a 1) safety event; a 2) dating event; a 3) travel event; or 4) a taxi event, and so on. In step 500, the user may enter data indicating that they wish to designate an event type to an event. In steps 501, 502, 503, and 504, user 100 is either presented with inquiries as to the type of event being scheduled, or is provided the ability to select an event type from a pre-determined list. Once an event has been designated to be of a particular event type, user 100 may enter information specific to a particular event based on the event type in step 507, whereupon the event information is stored 508 in non-transitory computer readable media in communication with server 101. The user may also be presented with the option to select bodyguard mode in step 505, 506. If the user elects YES, geolocation information is transmitted from personal electronic device 106 to server 101, whereupon server 101 tracks user 100's location and keeps a history of user 100's movements so that if an alarm is escalated, user 100's most recent geographic position, and, optionally, a history of their movements, may be transmitted to either the designated emergency contact(s) for that event, or to emergency responder(s), or both.

Figure 6:
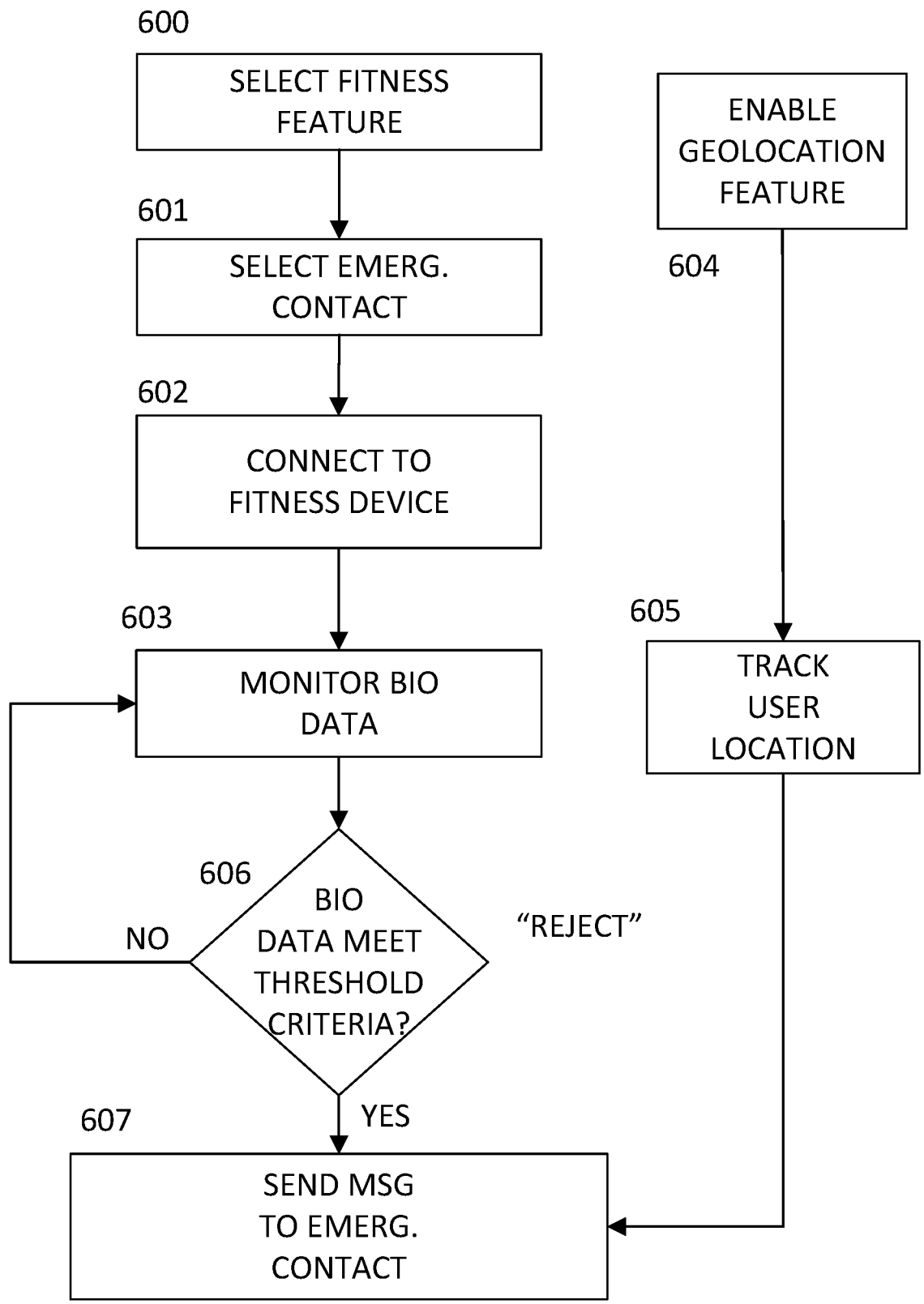
FIG. 6 depicts a flow diagram for integration with a fitness device, and for monitoring biological data of the user.

Referring now to FIG. 6, a flow diagram for integration with a fitness device, and for monitoring biological data of the user, is depicted. A fitness device is typically a wearable device, sometimes worn on the wrist, which measures biometric data for a user. The biometric data may, for example, include heart rate information. In step 600, user 100 is presented with an option to enable fitness device integration. If the user selects this option, the user may be presented with the opportunity to enter emergency contact information in step 601. This step may be repeated until all desired emergency contacts have been entered. In step 602, the personal electronic device 106, which may be, for example, a mobile phone with a transceiver adapted to communicate wirelessly with the fitness device via link 207 as shown in FIG. 1, establishes a communication link with the fitness device such that the fitness devices is enabled to transmit biometric data to personal electronic device 106. Next, in step 603, either personal electronic device 106 or server 101 monitors the user's biometric data and compares the biometric data to a predetermined threshold. If the biometric data exceeds a threshold, step 606, an alarm message is transmitted by server 101 to the at least one emergency contact in step 607. In parallel with these steps, in step 604 a user may also initiate the geolocation feature of their personal electronic device 106, whereupon user data terminal may provide the user's geolocation information in step 605 to server 101. Thus, if an alarm is transmitted in step 607, the alarm message that is transmitted to the at least one emergency contact may also include user 100's last known geographic location. As an example, if user 100 is embarking on a 10 kilometer run or bicycle ride and experiences a high heart rate event, server 101 may transmit an alarm message to the emergency contact and may also provide user 100's last known location.

Figure 7:
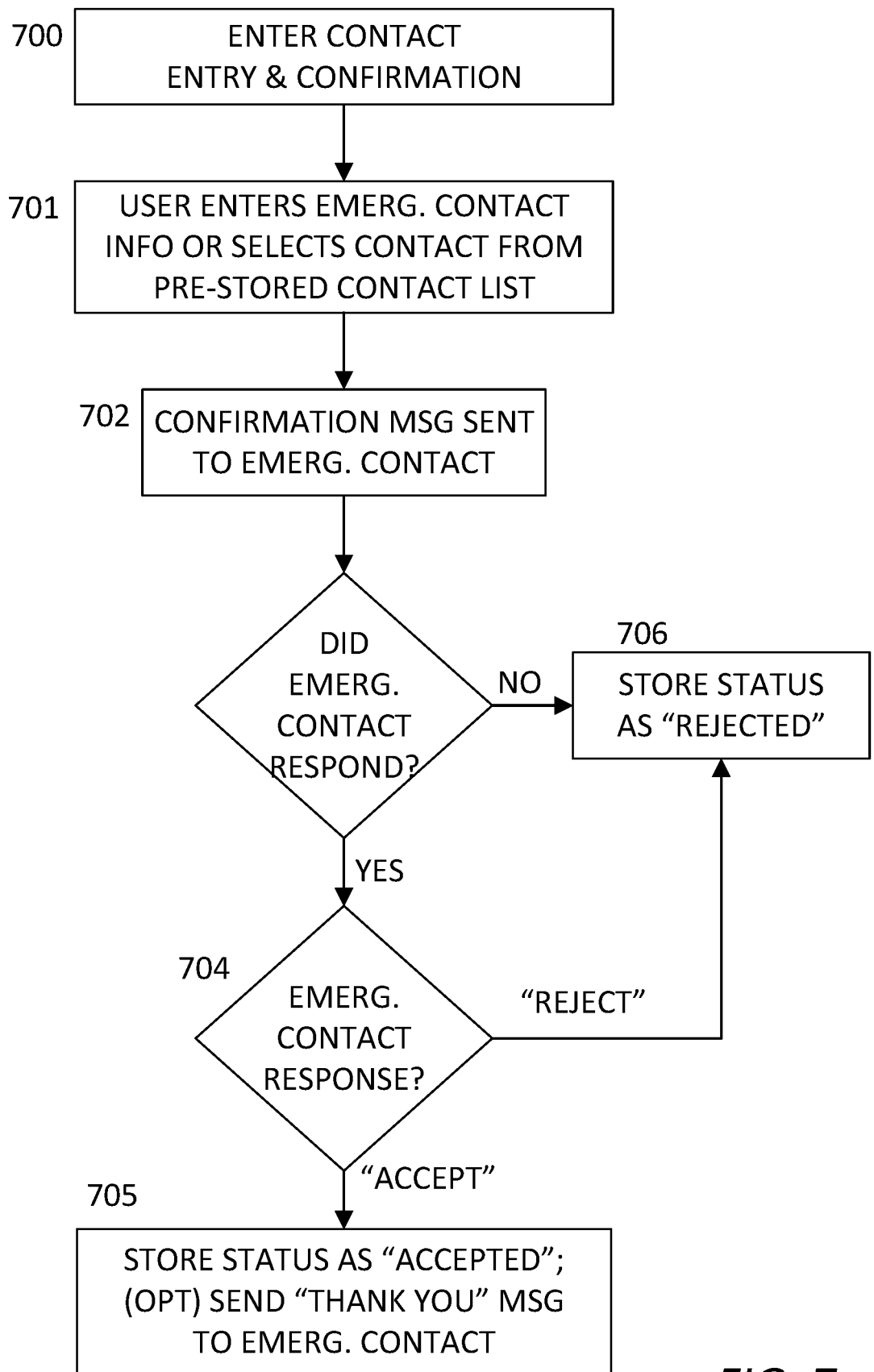
FIG. 7 depicts a flow diagram for identifying an emergency contact, and for querying a prospective emergency contact to determine whether the emergency contact accepts the designation of emergency contact, is depicted.

Referring now to FIG. 7, a flow diagram for identifying an emergency contact, and for querying a prospective emergency contact to determine whether the emergency contact accepts the designation of emergency contact, is depicted. In step 700, user 100 may be presented with the ability to identify enter emergency contacts. In step 701, user 100 enters emergency contact information, or may select a contact from a pre-existing contact database that has previously been stored on the user's user data terminal 105. For example, this may be the user's contact list stored in the user's cell phone. Once an emergency contact has been entered or selected, in step 702, server 101 may transmit a message to the prospective emergency contact. This message may be a text message, an email message, or any other message type. The prospective emergency contact may either respond or not respond, step 704. If the prospective emergency contact does not respond within a predetermined time, the prospective emergency contact is deemed to have rejected the request to be an emergency contact for the user, step 706, and that prospective emergency contact will not be utilized as an emergency contact. If the prospective emergency contact does respond, they may either respond with a "reject" or an "accept" code that is provided to them in the message sent to them in step 702. If the prospective emergency contact responds with a "reject" code, that prospective emergency contact is deemed to have rejected the request to be an emergency contact for the user, step 706, and that prospective emergency contact will not be utilized as an emergency contact. If the prospective emergency contact responds with an "accept" code, that prospective emergency contact will be added to the emergency contact list stored on server 101, and a "thank you" message may be generated and transmitted to the emergency contact, step 705.

Figure 8:
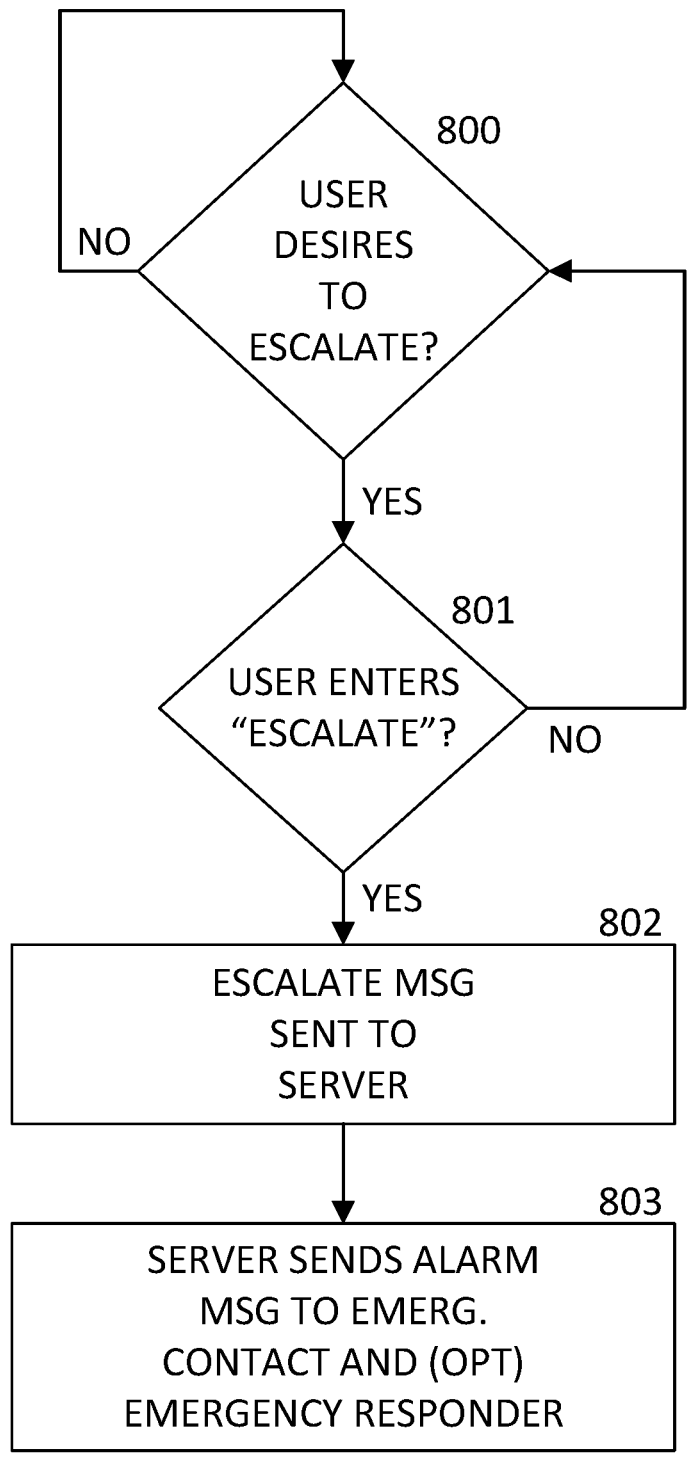
FIG. 8 depicts a flow diagram for the escalation of an alarm indicating a need for help.

Referring now to FIG. 8, a flow diagram for the escalation of an alarm indicating a need for help is depicted. The user is presented with an option to escalate an alarm event, step 800. User alarm event escalation may be initiated by selecting or depressing a button for data entry presented on the touchscreen of a mobile phone that is being utilized as a personal electronic device 106, or by programming one of the physical buttons on a cell phone to act as an alarm event escalation button. If user 100 elects to escalate an alarm event, they select or depress the alarm event escalate button, step 801, causing an "escalate alarm event" message to be transmitted 802 from personal electronic device 106 to server 101. Server 101 then transmits an alarm message 803 to all the emergency contacts that have been designated by user 100, and server 101 also optionally transmits an alarm message to an emergency responder or first responder system, such a 911 or E911 system as described in this disclosure, and thus dispatching first or emergency responder's to the location of a user who is in distress. This one way in which the system determines that an alarm event has occurred.

In an escalation of an alarm event, an SMS or pre-recorded telephone message may be transmitted to either an emergency contact, or an emergency responder, or both, containing any one, any combination or all of the user identifying indicia, contact identifying indicia, or event information. Any alarm message, and any check-in or alert message, may be either telephone call, which may comprise a pre-recorded audio message, or may be an SMS message.

In any of the embodiments, an escalation of an alarm event may notify an E911 or 911 system, or equivalent system, and provide information to the about a user, the user's intended meeting location, the user's actual location, or information about the contact, in any combination, an E911 or 911 system as follows. In embodiments, this notifying of a 911 or E911 system such that first or emergency responders may be dispatched to a geographic location that is within their geographic jurisdiction of operation may be performed automatically by the system of the invention, without any action required by the user to initiate the escalation event or alarm, and without the need for any intermediary such as a call center.

Figure 10:
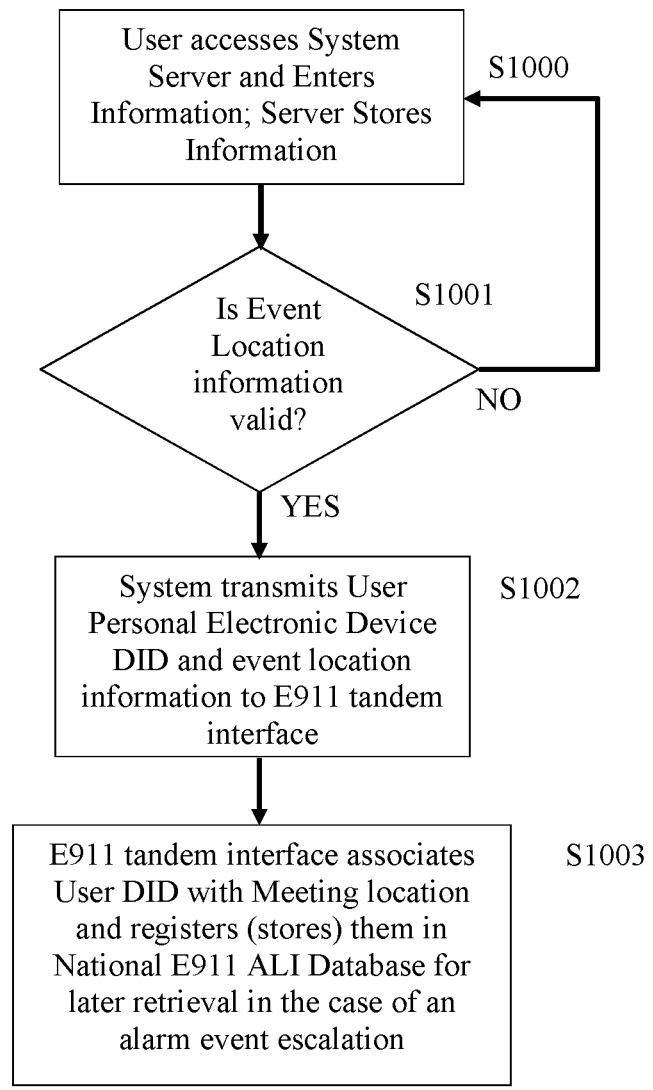
FIGS. 10 and 11 depict a flow chart of steps of a method of an embodiment of the invention that shows an exemplary method for communicating event information, including the user's personal electronic device phone number or DID, along with the geographic location information regarding a meeting location, or geolocation information for locating the user's personal electronic device, or both, to an emergency or first responder network such that first or emergency responders may be dispatched to the meeting location or to the geographic location of the user's personal electronic device, without the need for any interaction with the user, and without the need for services of any call center.
Figure 11:
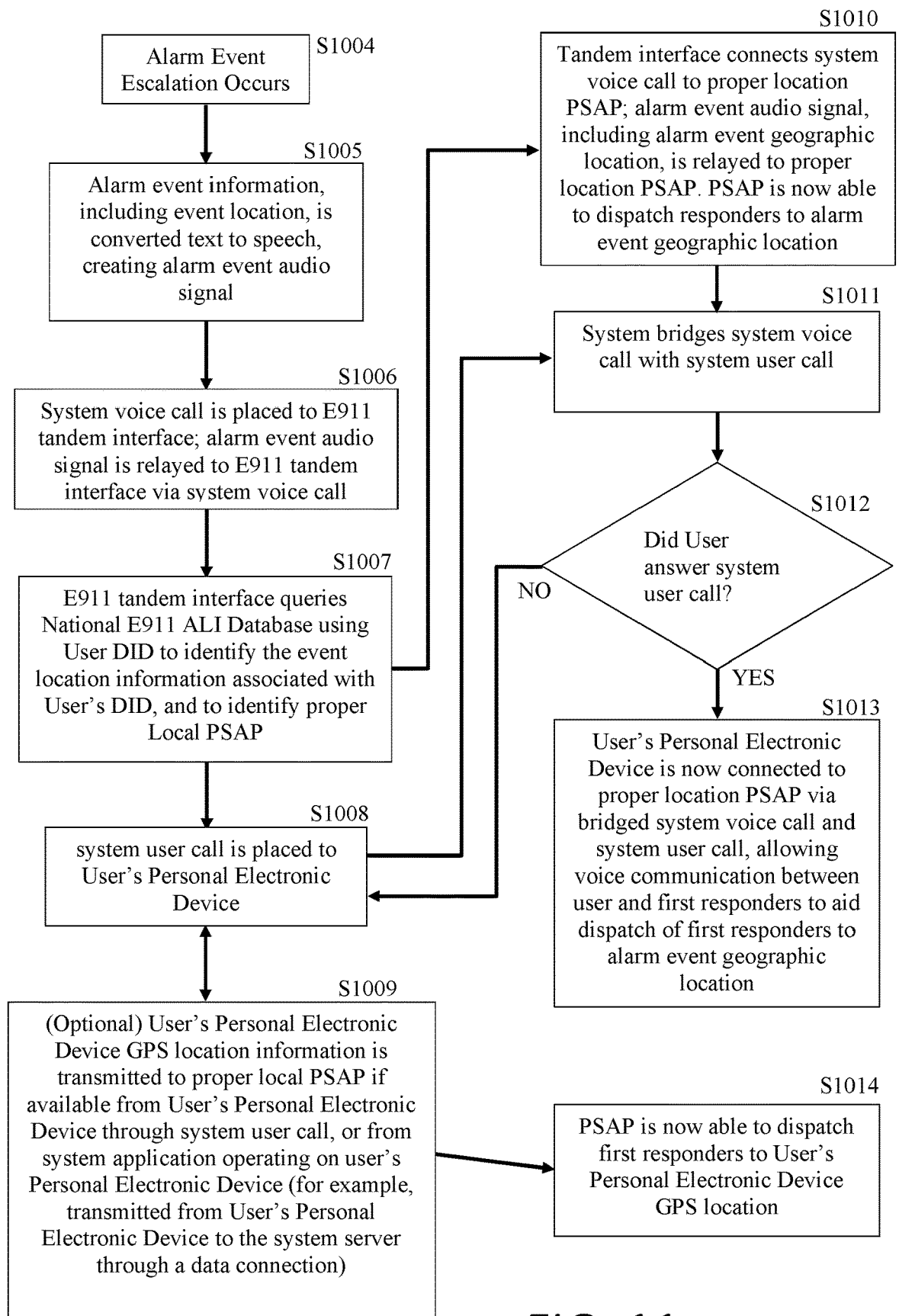

Referring now to FIGS. 9 thru 11, an exemplary embodiment of the system and method of the invention, which are able to provide information about a user, the user's intended meeting geographic location, the geographic location of the expected meeting place, the user's actual geographic location, the user's historic geographic location information for the preceding period of time, or information about the contact that was previously provided to the system, in any combination, to an E911 or 911 PSAP, and flow charts showing exemplary steps taken by the system to alert an E911 or 911 system that the user needs emergency assistance, are depicted.

Referring now to FIG. 9, an exemplary block diagram of an embodiment of the system of the invention is depicted. FIG. 9 depicts an exemplary connection between the system and components of an E911 system, in which the system of the invention is able to be in communication with the proper local PSAP whose geographic jurisdiction includes the geographic location of the expected meeting, or the geographic location of the user ("Location PSAP") 1002, alert Location PSAP 1002 that an alarm event is being escalated by the system, provide information about the user 100, the meeting geographic location, the user's geographic location, and the contact, in any combination, to Location PSAP 1002, and to connect the system and the user's personal electronic device 106 (for example, the user's mobile phone) 106 to the Location PSAP 1002 with a voice call so that the user may communicate directly with the location PSAP 1002, via, for example a bridged telephone call.

Still referring to FIG. 9, user data terminal 105, which may be, for example, a computer, electronic tablet, mobile phone, or any electronic device that is capable of connecting to a data network such as the Internet for communicating to other electronic devices, may be used to enter user, event, and contact information. User Data Terminal 105 may be in communication with System Server 101 (not shown in FIG. 9, but shown in FIG. 1) via any wired or wireless data communication network or combination of networks 200 and 205 (also depicted in FIG. 1), such as any Wide Area Network (WAN) Local Area Network (LAN), or the Internet. The user, event and contact information may then be communicated to System Server Software 1005, which may reside in physical storage media System Server Memory 1004 forming a part of, or in communication with, System Server 101.

Still referring to FIG. 9, the System Server Software 1005 may be in communication with Telco Software 1006 that may also reside in physical storage media System Server Memory 1004, or may reside in one or more remote server computer physical storage media. For example, and not by way of limitation, Telco Software 1006, and also Telco Bridge Software 1007, may, in embodiments, reside in remote servers or other computers that are in communication with System Server 101 via any wired or wireless data communication network or combination of networks and (also depicted in FIG. 1), such as any Wide Area Network (WAN) Local Area Network (LAN), or the Internet. Telco Software 1006 may comprise software for placing and receiving telephone calls via a standard telephone system or by Voice Over Internet Protocol (VOIP), and may further comprise software for converting text to a speech signal. Telco Software 1007 may comprise software for bridging voice telephone calls via a standard telephone system or Voice Over Internet Protocol (VOIP) connection to a caller through, for example, the Internet.

Still referring to FIG. 9, in embodiments, the system of the invention may be adapted to communicate with an emergency response system 104, providing user, event, and contact information, in any combination, to the emergency response system 104, enabling emergency response system 104 to dispatch first responders or emergency responders to the event location, the user's location, or to any desired location. In embodiments, the system may also connect a user's personal electronic device 106 to a first responder dispatch service, such as Location PSAP 1002, so that the first responder dispatch service may communicate with the user, for example, via a voice call, while first responders are being dispatched to the user's location as explained in further detail below.

Still referring to FIG. 9, an exemplary embodiment of an emergency response system 104 may comprise a dispatch service such as Location PSAP 1002, an E911 tandem interface 1003, a National E911 ALI database 1001, and a first responder or emergency responder 1008 that are interconnected logically and in communication with one another as shown in FIG. 9. While FIG. 9 depicts an exemplary embodiment of emergency response system 104, emergency response system 104 may comprise any system and/or configuration of interconnected computers, first responders, databases, and interfaces, in any combination and in any quantity, that would function and communicate as described herein regarding the exemplary elements Location PSAP 1002, E911 tandem interface 1003, National E911 ALI database 1001. For example, E911 tandem interface 1003 may be in communication, for example via a communication network or combination of networks, including the Internet, with National E911 ALI database 1001.

Still referring to FIG. 9, the National E911 ALI database 1001 may be, for example, a database that functions to receive and store geographic location information for given associated phone numbers (or pseudo numbers, such as an assigned Direct Inward Dialing, or DID, which is assigned to a phone number). The geographic location information may be in the form of a physical address (such as street or postal address), or geographic coordinates such as, but not limited to, GPS coordinates. In other words, the National E911 ALI database 1001 receives and stores, for later transmission or retrieval, phone numbers (or pseudo numbers, such as an assigned Direct Inward Dialing, or DID, number) and associated geographic location information for each phone number. The geographic location for each phone number or pseudo number is associated with that phone number or pseudo number in National E911 ALI database 1001. Further National E911 ALI database 1001 may be in communication with one or more Location PSAPs via a data or phone connection such as connection 1017. Thus, when a PSAP receives an escalation event, or emergency call, from a local person in distress, the PSAP is able to query National E911 ALI database 1001 to retrieve geographic location information associated with the person in distress's phone number, using caller ID to identify the person in distress. The National E911 ALI database 1001 may be comprised of one more regional E911 ALI databases, collectively forming National E911 ALI database 1001. The Location PSAP is able to dispatch first or emergency responders to locations that are within its local jurisdictional geographic boundaries, such as a city, a portion of a city, a town, a county, or the like. The Location PSAP is generally not able to dispatch first or emergency responders to locations that are not within its local jurisdictional geographic boundaries. This creates a problem when a person directly calls a Location PSAP from a location that is outside that PSAPs local jurisdictional geographic boundary—namely, that the PSAP cannot dispatch first or emergency responders to the user's location. In such case, the PSAP is not a proper Location PSAP for that user in distress. Further, the use of cell phones and VOIP systems have enabled users to generally dissociate their phone numbers from a specific geographic location. Thus, without additional features or methods, the information stored in the Location PSAP may become stale or out of date, and may not reflect the most recent geographic location for a particular phone number. Still further, there are many Location PSAPs comprising the E911 system in the United States, and comprising similar systems in other countries, each operating only within its own local jurisdictional geographic boundaries. Any particular caller to a PSAP may have an associated location in National E911 ALI database 1001 that is located outside that PSAP's local jurisdictional geographic boundaries. All of these factors reduce the effectiveness of legacy emergency response systems 104.

Referring now to FIGS. 9, 10 and 11, embodiments of the claimed, novel, system and method of the invention that overcome the aforementioned shortcomings of the prior art are described.

Referring to FIGS. 9 and 10, in a first step S1000, a user of the system 100 or a person acting on user 100's behalf, may access the system from a user data terminal 105 or user's personal electronic device 106 to enter event information, contact information, user information, check-in alert information, and any other information regarding an upcoming meeting or other event as described in this disclosure. This information may be received and stored by system server 101. User data terminal 105 may be in communication with one or more system servers 101 via communication networks 200 and 205, and the Internet or any other data network, as depicted in FIG. 1. System server software 1005 is executed by the processor of system server 101 to receive the Event Information from user data terminal 105 and store it in system server memory physical storage media 1004, which is in communication with system server 101 via connection 1015, or which forms a part of system server 101.

Next, in optional step S1001, the information regarding the geographic location of the meeting between the user 100 and the contact may be verified against a database of known good street addresses or other geographic locations. If the geographic location of the meeting between the user and the contact is not verified as a valid meeting location, the system may prompt the user to edit the meeting geographic location by displaying a message on the user's data terminal 105 or the user's personal electronic device 106. Once the meeting geographic location has been edited by the user, optional step S1001 may be repeated. This optional process may be repeated until the meeting geographic location has been verified as valid.

Still referring to FIGS. 9 and 10, once the geographic location of the meeting between the user and the contact is verified as a valid meeting location, or in any event if optional step S1001 is not implemented, the system of the invention, via system server software 1005 running on system server 101, or via telco software running on system server 101 or a remote server that is in communication with system server 101 via communication networks 205, 2001 and the Internet (see FIG. 1), assigns a unique DID number to the user's telephone number. In the case in which a plurality of users are using the system, each user personal electronic device 106 is assigned a unique DID. The event, contact, check-in alert, user, and other information may be stored in system server memory 1004 as digital text information, or in any format that is readable and usable for the text-to-speed functions described below, such as Speech Synthesis Markup Language (SSML).

Still referring to FIGS. 9 and 10, system server software 1005 or telco software 1006, either of which may comprise computer readable and executable non-transitory instructions for converting the event, contact, check-in alert, user, and other information stored in system server memory 1004 to a speech signal, retrieves some, any part of, or all of, the event, contact, check-in alert, user, and other information stored in system server memory 1004, and converts it to a speech signal for communicating to an E911 tandem interface via a voice, or audio, call in step S1002. The user's DID or phone number, or, in embodiments, the user's personal electronic device telephone number, along with at least the geographic location of the meeting between the user and the contact, are communicated to E911 tandem interface 1003 of an emergency response system 104 via connection 1012, which may a voice call placed through a telephone system 102, the call initiated by telco software 1006 that is placed to tandem interface 1003, establishing a voice call connection 1012. In this manner at least the user's DID or phone number, along with at least the geographic location of the meeting between the user and the contact, and, in embodiments, information regarding the geographic location of the user's personal electronic device 106, are communicated to E911 tandem interface 1003. In embodiments, any of the other event, contact, check-in alert, user, and other information elements may be communicated to E911 tandem interface 1003 as well. E911 tandem interface, which is in communication with National E911 ALI database 1001 via connection 1013 which may be an communication network, transmits at least the user's DID or phone number and the geographic location of the meeting between the user and the contact to National E911 ALI database 1001 where this information is stored as associated information in step S1003. I.e., the user's DID or phone number is associated with the geographic location of the meeting between the user and the contact, or with the geographic location of the users personal electronic device 106, and stored in National E911 ALI database 1001.

Referring now to FIG. 11, a method for connecting a proper Location PSAP to a user who is the subject of an escalation event is described. "Proper Location PSAP" means a Location PSAP for which the geographic location of the expected meeting with a contact, or the geographic location of the user's personal electronic device 106, is within the geographical jurisdiction boundaries of that Location PSAP, as relates to a user who is the subject an alarm event escalation. In embodiments, as described in this disclosure, the system of the invention is operable to determine that an alarm event has occurred, even if the user is unable to access or use their personal electronic device 106, and even if the user's personal electronic device 106 is not operable, when the user does not respond to a check-in call or text as herein described. Further, the user may also trigger an alarm event resulting in an escalation by entering a distress or alarm code or word when contacted by the system at the designated check-in time as herein described.

Still referring to FIG. 11, after a user has entered event information as depicted in FIG. 10 and described herein, the system may escalate an alarm event as hereinbefore described, in step S1004. Once the alarm event has been escalated, either system software 1005 or telco software 1006 may retrieve alarm event information comprising any of the event information entered by the user, but at least comprising meeting location information and user's personal electronic device 106 DID or phone number (both the meeting location information and user's personal electronic device 106 DID or phone number having been previously been communicated to the National E911 ALI Database 1001 and stored there as associated data, as described relative to FIG. 10), from system server memory 1004, and convert this information to a speech signal, creating an alarm event audio signal that contains the user's personal electronic device 106 DID or phone number and alarm event geographic location information, which may include either the meeting geographic location information, or the user's personal electronic device 106 geographic location information, or both (collectively, the "alarm event information"), in step S1005. In step S1006, telco software 1006 causes a voice call, the system voice call, which may be a voice telephone call made over telephone system 102 or a VOIP system, to be placed to an E911 tandem interface 1003 or equivalent structure, which receives the system voice call containing the alarm event audio signal. In step S1007, E911 tandem interface 1003, using the user's personal electronic device 106 DID or phone number, may query National E911 ALI Database 1001, and may also retrieve the geographic location information that has been previously associated with the user's personal electronic device 106 DID or phone number, and may retrieve the identity and contact information, such as telephone contact information, for the proper Location PSAP within which the meeting geographic location is located. At this point, then, E911 tandem interface 1003 has knowledge of the contact information for the proper location PSAP 1002, i.e. the proper location PSAP 1002 within the geographical jurisdictional boundaries of which the meeting (or event) location information is geographically located, and also may have knowledge of the alarm event geographic location, which may include geographic location of the expected meeting location place for the event that is correlated to the check-in call or text that was made by the system that indicated the need for the alarm event escalation, or it may include the current geographic location of the user's personal electronic device.

In a next step S1010, E911 tandem interface 1003 may route the system voice call, via a telephone system 102, to the proper location PSAP 1002, and relay the alarm event audio signal to the proper location PSAP 1002. In embodiments, E911 tandem interface 1003 may initiate a new voice call to proper location PSAP 1002 containing the alarm event audio signal, or equivalent messages, containing the alarm event information, which includes the alarm event geographic location; or may forward, route or bridge the system voice call to location PSAP 1002. In any event, the proper location PSAP has now been provided with at least the user's DID or phone number and with the alarm event information, which has been verified by the E911 tandem interfaced to be within the jurisdictional boundaries of proper location PSAP 1002, thus enabling location PSAP 1002 to dispatch first responders or emergency responders to the alarm event geographic location, which may be the meeting location that was entered into the system by the user in step S1000, or may be the geographic location of the user's personal electronic device 106. And thus, without any interaction from the user, who could potentially be incapacitated, and without the need for any call center or other intermediary, emergency personnel have been automatically dispatched by the system and method of the invention to the alarm event geographic location to provide security intervention for the user distress, provide medical assistance to the user in distress, or to provide any other assistance needed by the user in distress.

Still further, in an optional step S1008, a system user call, which may be a voice telephone call made over telephone system 102 or a VOIP system, may be placed by telco software 1006 to the user's personal electronic device 106, and this call may be bridged with the system voice call by telco bridge software 1007 in step S1011 such that the system user call and the system voice call are bridged together. If the user does not answer the attempted system user call from the telco software to the user's personal electronic device 106, then steps S1008 and S1011 are repeated, and may keep repeating, until the alarm event is over (such as, for example, when first or emergency responders arrive at the location of the meeting, or when the user sends a message from their personal electronic device 106 or other device to the system server providing a safe word or other information to the system indicating that the alarm event should be canceled. In step S1013, if the user does answer the system user call made by telco software 1006 to the user's personal electronic device 106, the user is connected to the proper location PSAP 1002 in the bridged voice call, and will be able to communicate directly with the dispatcher or other personnel at the proper location PSAP 1002 by voice communication. Thus, the user, without any action on their part and without any intervention by an intermediary such as a call center, has been connected via a voice call to the proper location PSAP 1002 in the event of an alarm event, allowing the user in distress to communicate directly with the dispatcher or even with the first responders in the case in which the proper location PSAP is able to bridge, transfer or forward the bridged system user call to the first or emergency responder. This is a significant improvement over the systems of the prior art, because the user in distress has been placed in direct voice communication with the dispatcher or the first responder without being required to take any action.

In a further optional step S1009, the user's personal electronic device 106 may provide geographic location information defining the location of the user's personal electronic device 106 to the system server software or the telco software, by responding to a communication from the system, which may be a data communication between the system server software or the telco software, or may be the system user call between the telco software and the user's personal electronic device 106. Such information may be physical address, i.e. street address, information, or may be geolocation coordinates such as GPS coordinates. If such user personal electronic device 106 geographic location information is provided to either system server software or telco software, it may be included in the system user call to E911 tandem interface 1003, such that it may be communicated to location PSAP 1002 by the E911 tandem interface 1003 when E911 tandem interface 1003 forwards, bridges or transfers the system voice call to location PSAP 1002, or when E911 tandem interface 1003 places an independent call or communicates electronically with Location PSAP 1002 in order to forward the event information to the location PSAP 1002. In this manner, the system operates to provide alarm event geographic location information, which may be physical, e.g. street, address or geolocation coordinate information, such as GPS geolocation coordinates, to the proper location PSAP 1002, without any interaction by the user 100. This is a significant improvement over the systems of the prior art.

The bridged connection between the user's personal electronic device 106 and local PSAP 1002 may be established in the case of an alarm event escalation without any interaction from the user whatsoever, and that the system server 101 may be geographically located at any location and does not need to be located in proximity to user 101 or to the proper location PSAP 1002. Thus, the problem of how to connect a user to a proper location PSAP 1002 for the purposes of dispatching first responders or emergency responders to the user's location when the user is disabled, separated from their personal electronic device 106, has lost power to their personal electronic device 106 or otherwise unable to take affirmative action has been solved by the system and method of the invention, without the need for a call center.

In embodiments, the system server may comprise non-transitory computer readable and executable instructions for receiving user personal electronic device geographic location information from the user's personal electronic device, and transmitting the user personal electronic device geographic location information to said proper location PSAP via the bridged system user voice call and said system voice call. In such embodiments, a software application comprising non-transitory computer readable and executable instructions residing on the user's personal electronic device 106 may cause user personal electronic device geographic location information, such as, for example, satellite-based geographic location coordinates, such as, for example, Global Positioning System (GPS), Global Navigation Satellite System (GLONASS), Galileo, or other satellite-based geographic location systems to be transmitted from the user's personal electronic device to system server 101 via a data network such as data communication paths 208 and 205. Alternatively, the user's personal electronic device 106 may communicate the user personal electronic device geographic location information to the system server via the system voice call, when the system server 101 connects to the user personal electronic device. In this manner the proper local PSAP may thus receive geographic location information for the user's personal electronic device 106, and may dispatch first or emergency responders to this geographic location. It is a further advantage of this embodiment of the system of the invention that there is no requirement for a call center that places the call to an emergency response system in the case of escalation. The costs and reliability issues associated with the operation of call centers are well known. The system of the invention is a significant improvement over the systems is that it fully operates to perform all of the functions described herein without the need for any call center.

Still further, in embodiments, it is not necessary that there be any human interaction whatsoever between the user and the system. In other words, the system of the invention may operate entirely automatically to identify that an alarm escalation event or alarm has occurred; to identify the proper Location PSAP 1002 that is in geographic proximity to the user and able to dispatch first responders to the geographic location of the meeting or, in embodiments, to the geographic location of the user's personal electronic device 106; to notify the proper Location PSAP 1002 of the user's location, the identification and other information about the user, event information, the identification and other information about the contact with whom the user expected to meet, the geographic location of the expected meeting between the user and the contact, the time at which the user failed to check in, and other information regarding the user, the contact or the meeting; and to connect the user's personal electronic device 106 with the proper Location PSAP 1002 via a telephone call or data communication.

The elimination of the need for a call center to perform the described features and functions of the system and method of the invention, and the ability to automatically identify and connect the user to the proper Location PSAP even when the user is unable to place a call or respond to calls or messages sent to their personal electronic device 106, are significant advantages of the system of the invention over the systems of the prior art. Call centers create delays in messaging, are subject to connectivity interruptions, may be unreliable, may create data privacy and security risks, and generally result in very large expense of training employees, maintain facilities and equipment, and other expenses of operation and overhead. The system and method of the invention eliminates these short comings of personal systems based on call centers.

Any or all of the functions described herein may be executed by a controller or processor, such as microprocessor, executing non-transitory computer readable and executable instructions ("software") that are stored in, and retrieved from, physical data storage medium or media, which may be, for example, electronic, magnetic, or optical storage media. The retrieval and execution of such non-transitory computer readable and executable instructions by a controller or processor, such as a microprocessor, or other electronic components or circuits, may be utilized to carry out any or all of the functions of the system of the invention as described herein.

Any of the described functions and features of the invention may be present in any embodiment, in any combination. The intended scope of the invention includes the embodiments specifically described herein and all equivalents. The steps of the invention as depicted in the figures and described herein are shown in the depicted order for convenience; however, they may be performed in any order as long as the purposes of the invention are not frustrated.

INDUSTRIAL APPLICABILITY

A system and method providing for determining the status of a user and escalating an alarm in the event the user is determined to be disposed in a dangerous condition. The system of the invention attempts to contact the user at a predetermined check-in time, and notifies a pre-designated third-party which may be an emergency responder such as law enforcement or other emergency contact in the event that the user fails to respond to the check in request or signals that they are in danger using an escalate feature of the invention. The system operates autonomously to notify pre-designated emergency contacts or emergency responders in the case in which a user has been rendered unable to respond. The user may identify specific individuals with whom they plan to meet and the invention may also track the user's geo-location. The invention may also monitor biometric data of the user.

The system and method of the invention provide notification to emergency contacts and emergency responders at a pre-determined time relative to a known event such as a meeting, date, or other event. The method and system of the invention allow for a greatly reduced timeframe for emergency response, which is likely to have a significant positive impact on the probability that an emergency responder, such as law enforcement officers, will be able to successfully intervene and resolve a dangerous event before the event escalates beyond control, or before a victim has been seriously injured or taken.

What is claimed is:

1. A method for a dispatching first responders to an event location of a user who is in distress using a personal electronic device associated with the user, comprising;
   receiving and storing, by a server, Direct Inward Dialing (DID) associated with said user's personal electronic device and event information of an event comprising at least the event location entered by said user;
   monitoring, by the server, said user has arrived at the event location based on geographic location transmitted by the personal electronic device;
   transmitting, by the server, a check in alert to the personal electronic device in response to determine said user has arrived at the event location;
   determining, by the server, that an alarm event has occurred when the user does not respond to the check in alert;
   generating, by the server, alarm event information comprising the event location associated with said alarm event in response to determining that an alarm event has occurred;
   retrieving, by the server, said personal electronic device DID, said event information, and said alarm event information from storage and converting it, in real time, to an alarm event speech signal for communicating same via a voice call;
   transmitting, by the server, said alarm event speech signal containing said alarm event information to an E911 tandem interface via a system voice call of said server, such that said E911 tandem interface determines a proper location Public Safety Answering Point (PSAP) having a jurisdictional geographic area that includes the event location of the alarm event;
   routing the system voice telephone call to the proper location PSAP by the E911 tandem interface; and
   communicating the alarm event speech signal to the proper location PSAP, enabling the dispatch of the first responders to the event location by the proper location PSAP.

2. The method of claim 1, wherein said check in alert is a check-in telephone call, and wherein said alarm event is further defined as said user not responding to said check-in telephone call, said telephone call made at a predetermined time to said user's personal electronic device.

3. The method of claim 1, wherein said check in alert is a check-in message, and wherein said alarm event is further defined as said user not responding to a check-in message transmitted at a predetermined time to said user's personal electronic device.

4. The method of claim 1, where said check-in alert is a check-in telephone call or a check-in message, and wherein said step of determining that said alarm event has occurred is further defined as said user responding to said check-in telephone call or check-in message with a distress code.

5. The method of claim 1, further comprising the steps of placing a system user call from said server to said personal electronic device of said user, and bridging said system user voice call with said system voice call.

6. The method of claim 5, wherein, if said user does not answer said system user call, said server repeats the step of placing a system user call from said server to said personal electronic device of said user.

7. The method of claim 5, further comprising the step of said server receiving user personal electronic device geographic location information from said user's personal electronic device, and transmitting said user personal electronic device geographic location information to said proper location PSAP via the bridged system user call and said system voice call.

8. The method of claim 1, further comprising the step of said server receiving user personal electronic device geographic location information from said user's personal electronic device via a data communication network, and transmitting said user personal electronic device geographic location information to said proper location PSAP via the bridged system user voice call and said system voice call.

9. A system for dispatching first responders to an event location of a user who is in distress using a personal electronic device associated with the user, comprising;
   a system server in communication with the personal electronic device;
   wherein said system server is also in communication with an E911 tandem interface; and
   wherein said system server comprises non-transitory computer readable and executable instructions by one or more processors for:
   receiving and storing Direct Inward Dialing (DID) associated with said user's personal electronic device and event information of an event comprising at least the event location entered by said user;
   monitoring said user has arrived at the event location based on geographic location transmitted by the personal electronic device;
   transmitting a check in alert to the personal electronic device in response to determine said user has arrived at the event location;
   determining that an alarm event has occurred when the user does not respond to the check in alert;
   generating alarm event information comprising the event location associated with said alarm event in response to determining that an alarm event has occurred;
   retrieving said personal electronic device DID, said event information, and said alarm event information from storage and converting it, in real time, an alarm event speech signal for communicating same via a voice call:
   transmitting said alarm event audio signal containing said alarm event information to said E911 tandem interface via a system voice telephone call, such that said E911 tandem interface is able to determine a proper location Public Safety Answering Point (PSAP) having a jurisdictional geographic area that includes the event location of the alarm event;
   remaining connected to the proper location PSAP via the system voice telephone call while the location PSAP routes the system voice telephone call to the proper location PSAP; and
   communicating the alarm event speech signal to the proper location PSAP, enabling the dispatch of the first responders to the event location by the proper location PSAP.

10. The system of claim 9, wherein said check in alert is a check-in telephone call, and said system server further comprising non-transitory computer readable and executable instructions by the one or more processors for determining that said alarm event has occurred by detecting that said user not has not responded to said check-in telephone call.

11. The system of claim 9, wherein said check in alert is a check-in message, and said system server further comprising non-transitory computer readable and executable instructions by the one or more processors for determining that said alarm event has occurred by detecting that said user has not responded to said check-in message.

12. The system of claim 9, where said check-in alert is a check-in telephone call or a check-in message, and wherein said step of determining that said alarm event has occurred is further defined as said user responding to said check-in telephone call or check-in message with a distress code.

13. The system of claim 9, said system server further comprising non-transitory computer readable and executable instructions by the one or more processors for placing a system user call from said system server to said personal electronic device of said user, and for bridging said system user call with said system voice call.

14. The system of claim 13, said system server further comprising non-transitory computer readable and executable instructions by the one or more processors for repeatedly placing a system user call from said system server to said personal electronic device of said user if said user does not answer said system user call.

15. The system of claim 13, said system server further comprising non-transitory computer readable and executable instructions by the one or more processors for receiving user personal electronic device geographic location information from said user's personal electronic device, and transmitting said user personal electronic device geographic location information to said proper location PSAP via the bridged system user call and said system voice call.

16. The system of claim 9, said system server further comprising non-transitory computer readable and executable instructions by the one or more processors for receiving user personal electronic device geographic location information from said user's personal electronic device via a data communication network, and transmitting said user personal electronic device geographic location information to said proper location PSAP via the bridged system user call and said system voice call.

* * * * *